(12) United States Patent
Ishitani

(10) Patent No.: US 11,082,725 B2
(45) Date of Patent: Aug. 3, 2021

(54) VIDEO DISTRIBUTION SYSTEM, TERMINAL DEVICE, AND VIDEO DATA DISTRIBUTION DEVICE

(71) Applicant: KDDI CORPORATION, Tokyo (JP)

(72) Inventor: Yuuichirou Ishitani, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 0 days.

(21) Appl. No.: 16/488,122

(22) PCT Filed: Feb. 27, 2018

(86) PCT No.: PCT/JP2018/007175
§ 371 (c)(1),
(2) Date: Aug. 22, 2019

(87) PCT Pub. No.: WO2018/155703
PCT Pub. Date: Aug. 30, 2018

(65) Prior Publication Data
US 2020/0045347 A1 Feb. 6, 2020

(30) Foreign Application Priority Data

Feb. 27, 2017 (JP) .............................. JP2017-035173
Mar. 31, 2017 (JP) .............................. JP2017-069757

(51) Int. Cl.
*H04N 21/218* (2011.01)
*H04N 21/2343* (2011.01)
(Continued)

(52) U.S. Cl.
CPC ... *H04N 21/2343* (2013.01); *H04N 21/21805* (2013.01); *H04N 21/25875* (2013.01); *H04N 2013/405* (2018.05)

(58) Field of Classification Search
CPC ....... H04L 65/60; H04L 65/602; H04L 67/28; G06F 16/735; G06Q 30/02; G06Q 10/087;
(Continued)

(56) References Cited

U.S. PATENT DOCUMENTS 5,892,856 A * 4/1999 Cooper ...................... G06T 7/20
382/291
2002/0186220 A1* 12/2002 Sakaguchi ............. H04N 19/20
345/473
(Continued)

FOREIGN PATENT DOCUMENTS

JP  H06-149694 A   5/1994
JP  H09-282249 A  10/1997
(Continued)

OTHER PUBLICATIONS

Debevec et al., "Modeling and Rendering Architecture from Photographs: A hybrid geometry- and image-based approach," SIGGRAPH, 1996, pp. 1-10.
(Continued)

*Primary Examiner* — Tesfay Yohannes
(74) *Attorney, Agent, or Firm* — Foley & Lardner LLP

(57) ABSTRACT

A video distribution system includes a terminal device and a video data distribution device. The terminal device includes an identification information output part configured to output identification information representing first video data, which is generated from an original video, to the video data distribution device, and a video acquisition part configured to acquire second video data, which is generated from the original video and different from the first video data, from the video data distribution device. The video data distribution device includes an identification information acquisition part configured to acquire the identification information from the terminal device, and a video output
(Continued)

part configured to output the second video data to the terminal device based on the identification information.

24 Claims, 19 Drawing Sheets

(51) Int. Cl.
*H04N 21/258* (2011.01)
*H04N 13/30* (2018.01)

(58) Field of Classification Search
CPC ............. G06Q 50/184; H04N 21/2343; H04N 21/21805; H04N 21/25875; H04N 2013/405; H04N 21/2353; H04N 21/4316; H04N 21/23418; H04N 21/25833; H04N 21/25825; H04N 21/2662; H04N 21/4424; H04N 21/234363
USPC .......................................................... 790/231
See application file for complete search history.

(56) References Cited

U.S. PATENT DOCUMENTS

| | | | | |
|---|---|---|---|---|
| 2005/0031164 A1* | 2/2005 | Fuhrmann | ............... | G06K 9/033 382/101 |
| 2008/0172692 A1* | 7/2008 | Kondo | ............... | H04N 7/17318 725/39 |
| 2008/0249801 A1* | 10/2008 | Zaleski | ................ | G16H 40/67 705/2 |
| 2009/0022473 A1* | 1/2009 | Cope | .................... | H04N 9/8205 386/278 |
| 2010/0039507 A1* | 2/2010 | Imade | ...................... | A61B 1/05 348/68 |
| 2010/0332404 A1* | 12/2010 | Valin | ...................... | G06Q 99/00 705/310 |
| 2011/0074911 A1* | 3/2011 | Khouri | ................... | H04N 7/147 348/14.08 |
| 2012/0147197 A1* | 6/2012 | Hjelmstrom | ....... | H04N 5/23212 348/187 |
| 2012/0311645 A1* | 12/2012 | Munetsugu | .......... | H04N 21/816 725/93 |
| 2013/0074139 A1* | 3/2013 | Cope | ............. | H04N 21/234318 725/114 |
| 2013/0113897 A1* | 5/2013 | Kurtovic | ................ | G01C 15/00 348/50 |
| 2013/0283655 A1* | 10/2013 | Saito | ...................... | B61K 13/00 40/370 |
| 2013/0305278 A1* | 11/2013 | Gordon | ............ | H04N 21/23617 725/32 |
| 2014/0150032 A1 | 5/2014 | Pacor et al. | | |
| 2014/0349753 A1* | 11/2014 | Imai | ........................ | H04L 67/06 463/31 |
| 2017/0230692 A1 | 8/2017 | Nakashima | | |

FOREIGN PATENT DOCUMENTS

| | | |
|---|---|---|
| JP | 2001-209364 A | 8/2001 |
| JP | 2007-194680 A | 8/2007 |
| JP | 2009-064445 A | 3/2009 |
| JP | 2009-077394 A | 4/2009 |
| JP | 2009-105591 A | 5/2009 |
| JP | 2013-501476 A | 1/2013 |
| JP | 2013-115440 A | 6/2013 |
| JP | 2014-082672 A | 5/2014 |
| JP | 2015-056889 A | 3/2015 |
| JP | 2015-185962 A | 10/2015 |
| JP | 2016-058994 A | 4/2016 |
| JP | 2016-123008 A | 7/2016 |
| JP | 2016-126425 A | 7/2016 |
| JP | 6040328 B1 | 11/2016 |
| JP | 2017-012397 A | 1/2017 |
| WO | WO-2010/110066 A1 | 9/2010 |
| WO | WO-2011/017474 A1 | 2/2011 |
| WO | WO-2014/024475 A1 | 2/2014 |
| WO | WO-2015/097922 A1 | 7/2015 |

OTHER PUBLICATIONS

International Search Report dated Apr. 10, 2018 in PCT/JP2018/007175.
Office Action issued in Japanese Application No. 2017-035173 dated Aug. 14, 2018, with English translation.
Office Action issued in Japanese Application No. 2017-069757 dated Jan. 8, 2019, with English translation.
Office Action issued in Japanese Application No. 2017-069757 dated May 21, 2019, with English translation.
Ohta et al., "Free-viewpoint Video System capable of Live Distribution and Interactive Presentation via Network," The Journal of the Institute of Image Electronics Engineers of Japan, The Institute of Image Electronics Engineers of Japan, Sep. 25, 2007, vol. 36, No. 5, pp. 814-820, with partial English translation.
Decision of Dismissal of Amendment issued in corresponding Japanese Patent Application No. 2017-069757 dated Aug. 13, 2019 with English translation.
Office Action issued in corresponding Japanese Patent Application No. 2019-033323 dated Oct. 23, 2019 with English translation.
Office Action for Japanese Patent Application No. 2019-192669 with English translation, dated Sep. 23, 2020, 8 pages.
Office Action issued in corresponding Japanese Patent Application No. 2019-192669, dated Apr. 13, 2021, with English translation.

* cited by examiner

| IDENTIFICATION INFORMATION SI | LOW-QUALITY VIDEO DATA LM | HIGH-QUALITY VIDEO DATA HM | ORIGINAL VIDEO DATA OM | |
|---|---|---|---|---|
| IDENTIFICATION INFORMATION 1 | LOW-QUALITY VIDEO DATA 1 | HIGH-QUALITY VIDEO DATA 1 | ORIGINAL VIDEO DATA 1 | ← SIL1 |
| IDENTIFICATION INFORMATION 2 | LOW-QUALITY VIDEO DATA 2 | HIGH-QUALITY VIDEO DATA 2 | ORIGINAL VIDEO DATA 2 | ← SIL2 |
| ⋮ | ⋮ | ⋮ | ⋮ | |

SIL

| PICTURE QUALITY | SOUND QUALITY | PRESENTATION START POINT | PRESENTATION END POINT |
|---|---|---|---|
| HIGH | LOW | 00:48:00 | 00:50:00 |

(t1)

(t2)

(t3)

VIDEO DISTRIBUTION SYSTEM, TERMINAL DEVICE, AND VIDEO DATA DISTRIBUTION DEVICE

CROSS-REFERENCE TO RELATED APPLICATIONS

This application is the U.S. National Stage of PCT/JP2018/007175, filed Feb. 27, 2018, which claims priority to Japanese Application Nos. JP 2017-069757, filed Mar. 31, 2017 and JP 2017-035173, filed Feb. 27, 2017, the entire contents of the foregoing being incorporated by reference.

TECHNICAL FIELD

The present invention relates to a video distribution system, a terminal device, and a video data distribution device. In addition, the present embodiments relate to an information distribution device and a terminal device.

The present application claims the benefit of priority on Japanese Patent Application No. 2017-35173 filed on Feb. 27, 2017 and Japanese Patent Application No. 2017-69757 filed on Mar. 31, 2017, the subject matter of which is hereby incorporated herein by reference.

BACKGROUND ART

Conventionally, technologies for distributing a large amount of content such as moving images to terminal devices have been known (e.g. Patent Document 1).

In addition, technologies for producing three-dimensional models of objects included in two-dimensional images have been known (e.g. Patent Document 2 and Non-Patent Document 1).

CITATION LIST

Patent Literature Document

Patent Document 1: Japanese Patent Application Publication No. 2013-115440
Patent Document 2: Japanese Patent Application Publication No. 2016-126425

Non-Patent Literature Document

Non-Patent Document 1: Paul E. Debevec, Camillo J. Taylor, Jitendra Malik, Modeling and Rendering Architecture from Photographs: A hybrid geometry- and image-based approach, "SIGGRAPH '96 Proceedings of the 23rd annual conference on Computer graphics and interactive techniques", (U.S.A.), 1996, P. 11-20

SUMMARY OF INVENTION

Technical Problem

Video distribution systems need to distribute a large amount of content designated by terminal devices. As high-quality moving images, for example, it is possible to mention 4K videos having 2,160 vertical pixels and 3,840 horizontal pixels.

However, high-quality moving images distributed to terminal devices may increase traffic over communication lines due to distribution and may cause problems such as delays in distributing information and deficiencies of information. In addition, it may be difficult to confirm a large volume of content due to processing capacities of terminal devices when designating desired content.

In sports venues, spectators watching competitions may not watch all the moving players. In this case, spectators may have demands to distribute a high-quality video capturing an image of a player designated by each spectator to a terminal device held by each spectator.

The present invention is made in consideration of the aforementioned circumstances, and therefore the present invention aims to provide a video distribution system, a terminal device, and a video data distribution device which can distribute a large amount of content to a terminal device.

In addition, it is necessary for information distribution devices to meet the needs of distributing content to many terminal devices in real time. In stadiums holding soccer games, for example, it is necessary to meet the needs of distributing the game-related content to terminal devices held by spectators watching the game in real time. For example, the content may represent moving images captured at a viewpoint designated by each spectator.

However, when distributing individual information to many terminal devices in real time, it may cause an extremely large traffic over communication lines due to information distribution, thus causing problems such as delays in information distribution and deficiencies of information.

One embodiment of the present invention aims to provide an information distribution device and a terminal device which can distribute content in real time.

Solution to Problem (1) In an aspect of the invention, a video distribution system includes a terminal device and a video data distribution device configured to distribute video data. The terminal device further includes an identification information output part configured to output identification information representing first video data, corresponding to video data which is generated from an original video and already distributed to the terminal device, to the video data distribution device, and a video acquisition part configured to acquire second video data, corresponding to a video which is generated from the original video and different from the first video data, from the video data distribution device. The video data distribution device further includes an identification information acquisition part configured to acquire the identification information output from the terminal device, and a video output part configured to output the second video data to the terminal device based on the identification information acquired by the identification information acquisition part.

(2) In an aspect of the invention, the video data distribution device further includes an identification information acquisition part configured to acquire identification information representing first video data which is generated from an original video, and a video output part configured to output second video data, corresponding to a video which is generated from the original video and different from the first video data, to the terminal device based on the identification information acquired by the identification information acquisition part.

(3) In an aspect of the invention, the video data distribution device as described in (2) further includes a setting information acquisition part configured to acquire setting information representing a setting of the second video data, wherein the video output part outputs the second video data according to the setting information acquired by the setting information acquisition part.

(4) In an aspect of the invention, the video data distribution device as described in (3) is designed such that the setting information includes presentation-start-point information representing a start point to present the second video data in the original video, and therefore the video output part outputs the second video data subsequent to the start point.

(5) In an aspect of the invention, the video data distribution device as described in (3) or (4) is designed such that the setting information includes viewpoint information representing a viewpoint of a video, and therefore the video output part outputs third video data, corresponding to a video which is generated based on the original video and the viewpoint information in correspondence with the viewpoint indicated by the viewpoint information, as the second video data.

(6) In an aspect of the invention, the video data distribution device as defined in any one of (2) to (5) is designed such that the second video data is video data having a higher picture quality than the first video data.

(7) In an aspect of the invention, a terminal device includes an identification information output part configured to output identification information representing first video data, corresponding to video data which is generated from an original video and already distributed to the terminal device, to a video distribution device, and a video acquisition part configured to acquire second video data, corresponding to a video which is generated from the original video and different from the first video data based on the identification information, from the video distribution device.

(8) In an aspect of the invention, the terminal device as described in (7) further includes a setting information generator configured to generate setting information representing a setting of the second video data, and a setting information output part configured to output the setting information, wherein the video acquisition part acquires the second video data according to the setting information generated by the setting information generator.

(9) In an aspect of the invention, the terminal device as described in (8) further includes a presentation-start-point information generator configured to generate presentation-start-point information representing a start point to present the second video data in the original video, wherein the setting information generator generates the setting information based on the presentation-start-point information generated by the presentation-start-point information generator, and therefore the video acquisition part acquires the second video data subsequent to the start point.

(10) In an aspect of the invention, the terminal device as described in (9) further includes a video presentation part configured to present video data on the terminal device, wherein when the presentation-start-point information is generated during presentation of the first video data with the video presentation part, the video presentation part switches the first video data at presentation to second video data subsequent to a data-presentation position indicated by the presentation-start-point information. The start point of the presentation-start-point information corresponds to a presentation point of the first video data at presentation with the video presentation part.

(11) In an aspect of the invention, the terminal device as described in any one of (8) to (10), further includes a viewpoint information generator configured to generate viewpoint information representing a viewpoint of a video, wherein the setting information generator generates the setting information based on the viewpoint information generated by the viewpoint information generator, and therefore the video acquisition part acquires the second video data based on the viewpoint information.

(12) In an aspect of the invention, the terminal device as described in any one of (7) to (11), further includes a settlement part configured to settle the payment of the second video data, and a settlement information output part configured to output settlement information representing a settlement result of the settlement part.

(13) In an aspect of the invention, the terminal device as described in any one of (7) to (12) is designed such that the video acquisition part acquires the second video data as streaming video data.

(14) In an aspect of the invention, a video distribution method using a video data distribution device configured to distribute video data includes the steps of: acquiring, by the video data distribution device, identification information representing first video data, corresponding to video data which is stored on a terminal device and generated from an original video, from the terminal device; and distributing second video data, corresponding to a video which is generated from an original video and different from the first video data, to the terminal device based on the identification information acquired by an identification information acquisition part.

(15) In an aspect of the invention, an information distribution device includes a video data acquisition part configured to acquire video data, a motion information generator configured to generate motion information for each model representing a motion of a model which is produced via image processing of a target information included in the video data based on the video data acquired by the video data acquisition part, a terminal information acquisition part configured to acquire terminal information either performance information of a terminal device, which the motion information is distributed to, or communication quality information representing a communication quality with the terminal device, a motion information volume adjustment part configured to adjust an information volume of the motion information generated by the motion information generator based on the terminal information acquired by the terminal information acquisition part, and a distribution part configured to distribute information-volume-adjusted motion information, which is adjusted by the motion information volume adjustment part, to the terminal device.

(16) In an aspect of the invention, the information distribution device as described in (15) further includes an adjustment degree information acquisition part configured to acquire adjustment degree information representing a degree of adjusting the information volume requested by the terminal device from the terminal device, wherein the motion information volume adjustment part further adjusts the information volume of the motion information generated by the motion information generator based on the adjustment degree information acquired by the adjustment degree information acquisition part.

(17) In an aspect of the invention, the information distribution device as described in (16) is designed such that the model includes a plurality of elements and a joint connected between the plurality of elements, and therefore the motion information volume adjustment part adjusts the information volume of the motion information generated by the motion information generator by adjusting the number of elements included in the model.

(18) In an aspect of the invention, the information distribution device as described in any one of (15) to (17) further includes a target image information acquisition part configured to acquire information relating to the target image, and therefore the distribution part distributes the information relating to the target image acquired by the target image information acquisition part to the terminal device together with the information-volume-adjusted motion information of the target image.

(19) In an aspect of the invention, the information distribution device as described in (18) is designed such that the information relating to the target image is information representing an attribute of the model subjected to distribution.

(20) In an aspect of the invention, the information distribution device as described in any one of (15) to (19) further includes a motion information distribution request acquisition part configured to acquire a motion information distribution request output from the terminal device, and a motion information storage unit configured to store the motion information generated by the motion information generator. The distribution part distributes the motion information stored on the motion information storage unit to the terminal device outputting the motion information distribution request according to the motion information distribution request acquired by the motion information distribution request acquisition part.

(21) In an aspect of the invention, the information distribution device as described in (20) is designed such that the distribution part distributes the motion information stored on the motion information storage unit to the terminal device when the information-volume-adjusted motion information is already distributed to the terminal device outputting the motion information distribution request.

(22) In an aspect of the invention, a terminal device includes a terminal information transmitter configured to transmit terminal information either performance information representing a performance of the terminal device or communication quality information representing a communication quality with an information distribution device to the information distribution device, a motion information receiver configured to receive motion information representing a motion of a model, corresponding to information which is generated by the information distribution device based on the terminal information and obtained via image processing of a target image included in video data, from the information distribution device, a status acquisition part configured to acquire a status of the terminal device, a moving image generator configured to generate a moving image of the model according to the status based on the motion information received by the motion information receiver and the status acquired by the status acquisition part, and a display configured to display an image including the moving image generated by the moving image generator.

(23) In an aspect of the invention, the terminal device as described in (22) is designed such that the status acquisition part acquires the status representing a position of the terminal device, and therefore the moving image generator generates the moving image depending on the position acquired by the status acquisition part.

(24) In an aspect of the invention, the terminal device as described in (22) or (23) is designed such that the status acquisition part acquires the status representing a viewpoint position which is designated, and therefore the moving image generator generates the moving image according to the viewpoint position acquired by the status acquisition part.

(25) In an aspect of the invention, the terminal device as described in any one of (22) to (24) is designed such that the status acquisition part acquires the status representing an ambient brightness of the terminal device, and therefore the moving image generator generates the moving image according to the brightness acquired by the status acquisition part.

Advantageous Effects of Invention

According to the present invention, it is possible to provide a video distribution system, a terminal device, and a video data distribution device, which can distribute a large amount of content to a terminal device.

According to one embodiment of the present invention, it is possible to provide an information distribution device and a terminal device which can distribute content in real time.

DESCRIPTION OF EMBODIMENTS

First Embodiment

Figure 1:
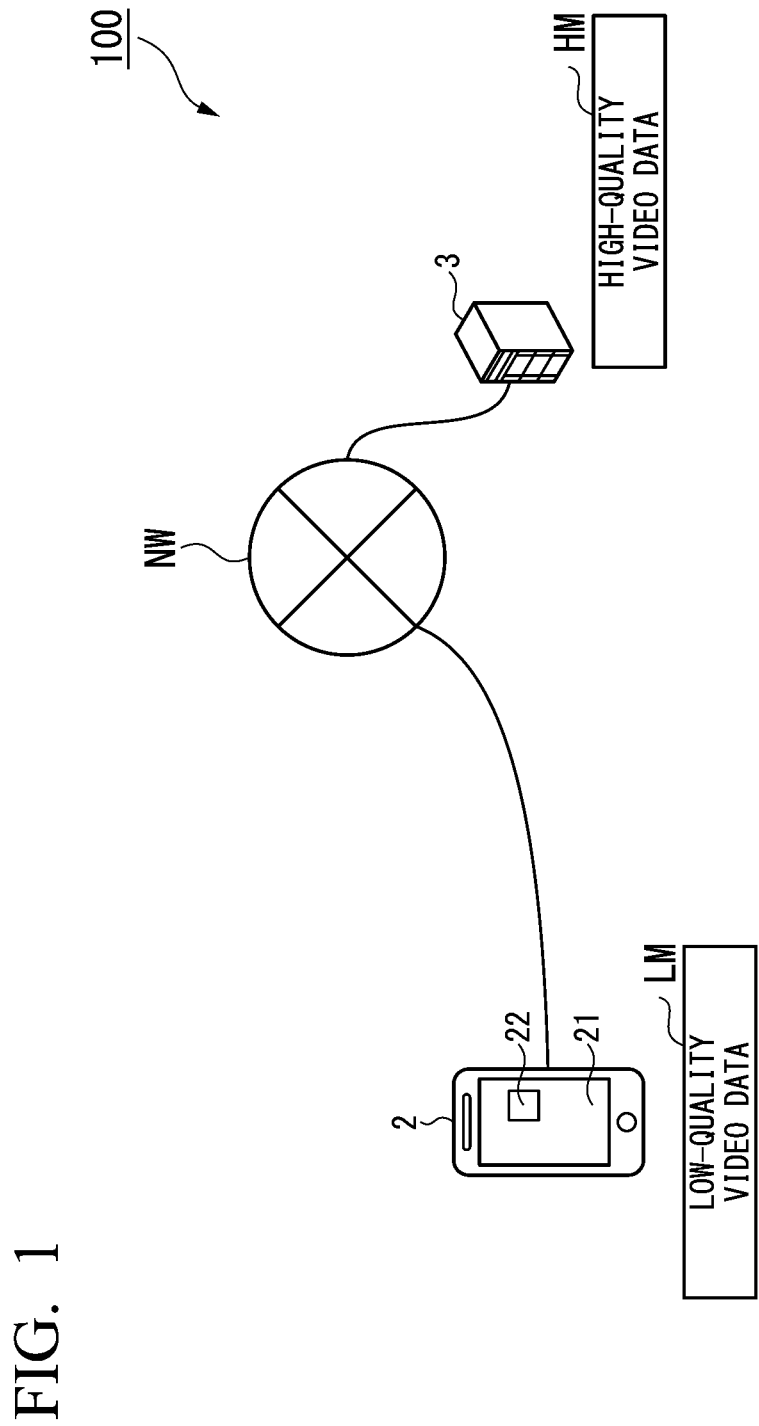
FIG. 1 is a schematic diagram showing an outline example of a video distribution system according to the first embodiment.

Hereinafter, a communication system of the first embodiment will be described with reference to the drawings. FIG. 1 is a schematic diagram showing an outline example of a video distribution system 100 according to the first embodiment.

<Outline of System>

The video distribution system 100 includes a video data distribution device 3. The video data distribution device 3 is connected to a terminal device 2 through a network NW.

The video data distribution device 3 distributes to the terminal device high-quality video data HM, which can be produced by way of image processing of an original video corresponding to video data captured by an imaging device. The high-quality video data HM is an example of second video data. The following descriptions refer to an original video corresponding to a video capturing images in a sports game.

As the terminal device 2 equipped with a display 21 and an operation part 22, for example, it is possible to mention a smartphone or a table terminal. For example, the operation part 22 is equipped with a touch panel to be operated by the user of the terminal device 2. For example, the display 21 is equipped with a liquid-crystal display used to display various images. The display 2 is configured to display images including images generated by the terminal device 2 based on the distributed information from the video data distribution device 3. The terminal device 2 is configured to store low-quality video data LM in advance. The low-quality video data LM is video data already distributed to the terminal device 2, i.e. video data made out of an original video. The low-quality video data LM is an example of first video data. In this connection, the low-quality video data LM is not necessarily limited to video data which is reduced in picture quality than the high-quality video data HM. The low-quality video data LM should be video data made out of an original video. In addition, the low-quality video data LM may be video data generated by the terminal device 2 based on the data made out of an original video by the video data distribution device 3.

Specifically, the low-quality video data LM may be video data adapted to the processing speed of the terminal device 2. For example, the low-quality video data LM may include CG moving images made out of an original video. For example, CG moving images may be videos made out of an original video and including many polygonal shapes (e.g. polygons), which can be displayed via shading processes in beaming directions and texture mapping on polygonal surfaces. In the following descriptions, moving images configured of polygons will be referred to as polygon-moving images.

Polygons included in polygon-moving images are produced by image processing of an image of a player captured in an original video OM. Specifically, polygons are produced based on model information which can be produced by modeling an image of a player using the known technique of calculating the skeleton and the center of gravity of a player.

The terminal device 2 generates a polygon-moving image by applying motion information to the model information. For example, the motion information is generated by image processing of an image of a player captured in the original video OM, wherein the motion information is distributed to the terminal device 2 together with the model information in advance.

That is, the low-quality video data LM is video data having a format suited to presentation by the terminal device 2. In other words, the low-quality video data LM represents the aforementioned polygon-moving data while the high-quality video data HM represents video data having the normal video format.

<Functional Configuration of Video Distribution System 100>

Hereinafter, an example of a concrete functional configuration of the video distribution system 100 will be described with reference to FIG. 2.

Figure 2:
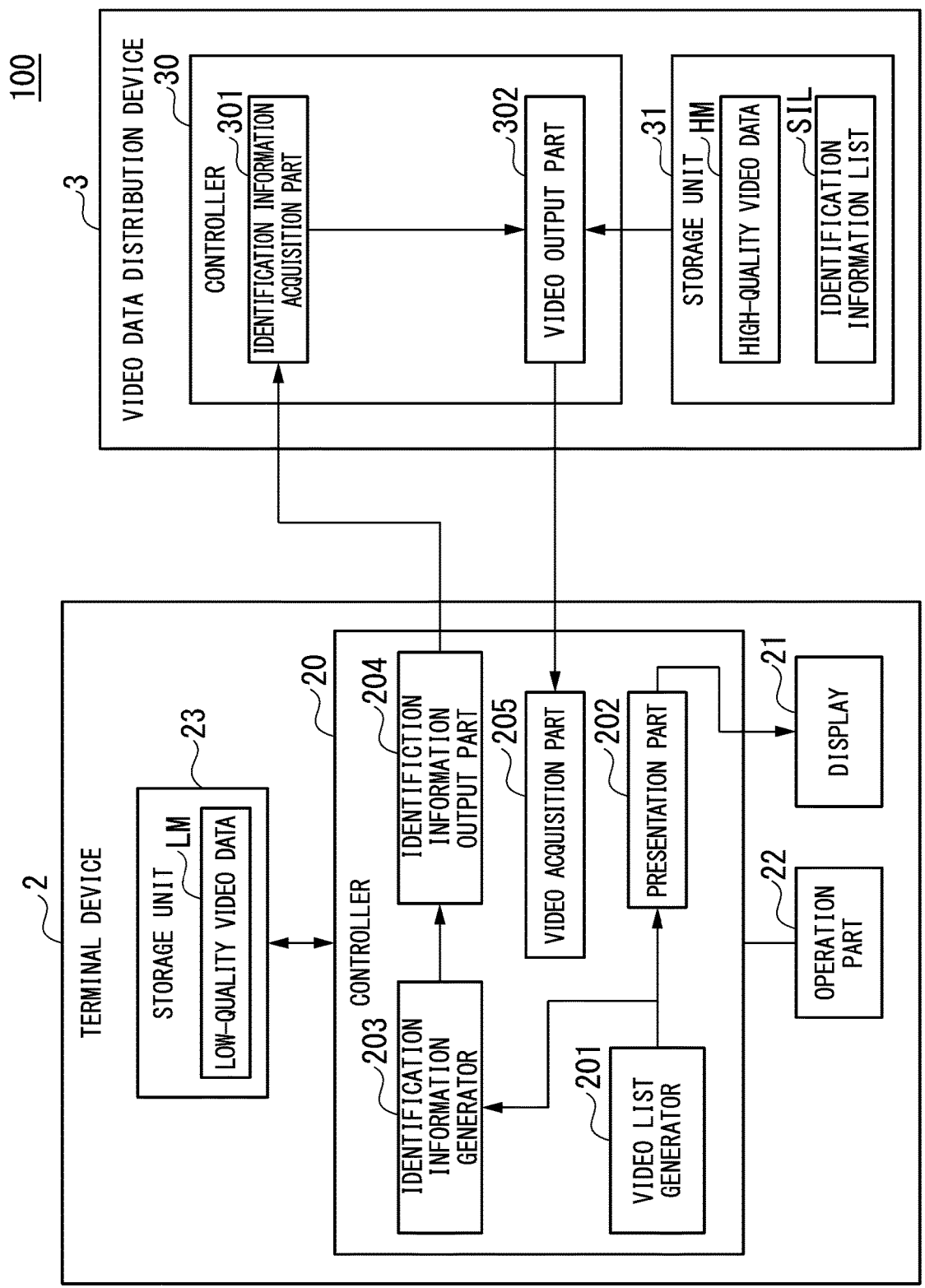
FIG. 2 is a block diagram showing the video distribution system according to the first embodiment.

FIG. 2 is a block diagram showing an example of the functional configuration of the video distribution system 100 of the present embodiment.

<Functional Configuration of Terminal Device 2>

The terminal device 2 includes a storage unit 23 and a controller 20 in addition to the aforementioned display 21 and the operation part 22.

The storage unit 23 is made out of non-volatile semiconductor memory and configured to store the aforementioned low-quality video data LM.

For example, the controller 20 including a CPU is configured to carry out various calculations as well as transmission and reception of information. The controller 20 includes functional parts representing a video list generator 201, a presentation part 202, an identification information generator 203, an identification information output part 204, and a video acquisition part 205. The controller 20 is configured to detect a user operation applied to the operation part 22.

The video list generator 201 generates a video list. The video list is a list describing thumbnail images and titles of low-quality video data LM stored on the storage unit 23. The video list generator 201 displays the video list on the display 21. A user may select the low-quality video data LM from the video list so as to designate the high-quality video data HM which should be acquired. The video list generator 20 is configured to detect a user operation to select desired data.

The video list generator 201 acquires the low-quality video data LM selected by the user from the storage unit 23. The video list generator 20 supplies the low-quality video data LM selected by the user to the presentation part 202. In addition, the video list generator 201 supplies the low-quality video data LM selected by the user to the identification information generator 203.

The presentation part 202 acquires the low-quality video data LM selected by the user from the video list generator 201. The presentation part 202 displays the low-quality video data LM, which is acquired from the video list generator 201, on the display 21.

The identification information generator 203 acquires the low-quality video data LM selected by the user from the video list generator 201. The identification information generator 203 generates the identification information representing the low-quality video data LM selected by the user. The identification information corresponds to the data included in the low-quality video data LM in advance. Specifically, the identification information is generated using the file name of the low-quality picture data LM and the attribute information of the low-quality video data LM. The identification information generator 203 generates and supplies the identification information to the identification information output part 204.

The identification information output part 204 acquires the identification information from the identification information generator 203. The identification information output part 204 supplies the identification information, which is acquired from the identification information generator 203, to identification information acquisition part 301.

The video acquisition part 205 acquires the high-quality video data HM, which corresponds to the low-quality video data LM selected by the user, from the video data distribution device 3.

<Functional Configuration of Video Data Distribution Device 3>

The video data distribution device 3 include a controller 30 and a storage unit 31. The storage unit 31 is configured of a hard-disk drive or non-volatile memory such as ROM (Read-Only Memory).

For example, the controller 30 includes a CPU to carry out various calculations as well as transmission and reception of information. The controller 30 includes functional parts such as an identification information acquisition part 301 and a video output part 302.

The identification information acquisition part 301 acquires the identification information output from the terminal device 2. As described above, the identification information represents the low-quality video data LM selected by the user who operates the terminal device 2. The identification information acquisition part 301 supplies the identification information, which is acquired from the terminal device 2, to the video output part 302.

The video output part 302 outputs the high-quality video data HM to the terminal device 2 based on the identification information acquired by the identification information acquisition part 301. The high-quality video data HM is made out of an original video of the low-quality video data LM selected by the user. The high-quality video data HM represents a video different from that of the low-quality video data LM selected by the user. For example, a different video means a video having a different picture quality. In this example, the high-quality video data HM is video data having a higher picture quality than the low-quality video data LM.

The video output part 302 acquires the high-quality video data HM corresponding to the low-quality video data LM selected by the user based on the identification information acquired from the identification information acquisition part 301 and an identification information list SIL stored on the storage unit 31. The video output part 302 acquires and outputs the high-quality video data HM, which corresponds to the low-quality video data LM selected by the user, to the video acquisition part 205.

Now, an example of the identification information list SIL will be described with reference to FIG. 3.

Figures 3, 4:
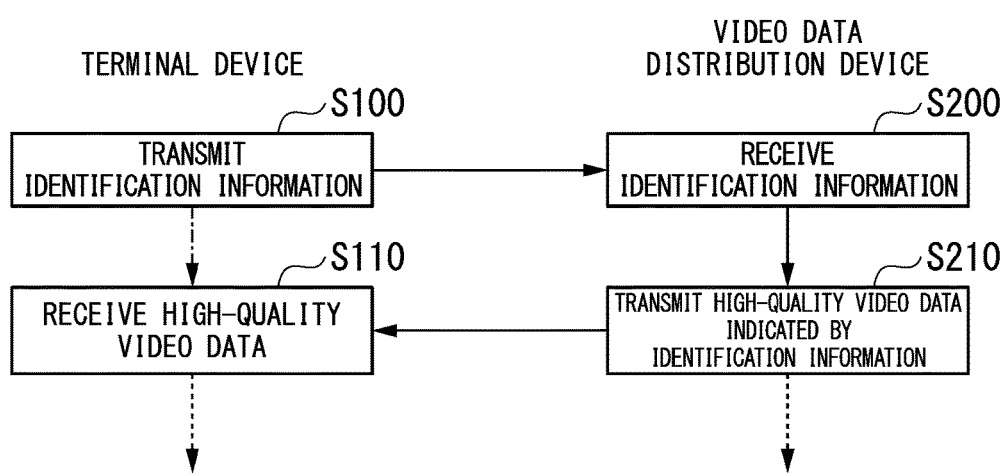
FIG. 3 shows a table describing an example of an identification information list according to the first embodiment.
FIG. 4 is a sequence diagram showing an example of an operation of the video distribution system according to the first embodiment.

FIG. 3 is a table describing an example of the identification information list SIL.

The identification information list SIL is a list correlating identification information SI, the low-quality video data LM, the high-quality video data HM, and the original video OM.

In this example, the identification information list SIL includes an identification information list SIL1 and an identification information list SIL2.

The identification information list SIL1 describes a correlation of information between "identification information 1" as the identification information SI, "low-quality video data 1" as the low-quality video data LM, "high-quality video data 1" as the high-quality video data HM, and "original video data 1" as the original video OM.

On the identification information list SIL, the identification information list SIL2 describes a correlation of information between "identification information 2" as the identification information SI, "low-quality video data 2" as the low-quality video data LM, "high-quality video data 2" as the high-quality video data HM, and "original video data 2" as the original video OM.

The video output part 302 selects the high-quality video data HM corresponding to the low-quality video data LM selected by the user based on the identification information for identifying the low-quality video data LM selected by the user and the identification information SI included in the identification information list SIL. Specifically, when the identification information for identifying the low-quality video data LM selected by the user indicates "identification information 2", the video output part 302 obtains "high-quality video data 2" as the high-quality video data HM from the storage unit 31.

<Operation of Video Distribution System 100>

Next, the operation of the video distribution system 100 will be described with reference to FIG. 4.

FIG. 4 is a sequence diagram showing an example of the operation of the video distribution system 100 according to the present embodiment.

(Step S100) The video list generator 201 generates a video list. The video list generator 201 detects a user operation to select the low-quality video data LM from the video list. The video list generator 201 obtains the low-quality video data LM selected by the user from the storage unit 23. The video list generator 201 supplies the low-quality video data LM selected by the user to the identification information generator 203. The identification information generator 203 obtains the low-quality video data LM selected by the user from the video list generator 201. The identification information generator 203 generates the identification information representing the low-quality video data LM obtained from the video list generator 201. The identification information generator 203 generates and supplies the identification information representing the low-quality video data LM to the identification information output part 204. The identification information output part 204 obtains the identification information representing the low-quality video data LM from the identification information generator 203. The identification information output part 204 outputs the identification information SI, which represents the low-quality video data LM obtained from the identification information generator 203, to the identification information acquisition part 301.

(Step S200) The video data distribution device 3 receives the identification information from the terminal device 2. The identification information acquisition part 301 acquires the identification information representing the low-quality video data LM from the identification information generator 203. The identification information acquisition part 301 outputs the identification information SI, which is acquired from the identification information generator 203, to the video output part 302.

(Step S210) The video data distribution device 3 transmits the high-quality video data HM indicated by the identification information SI obtained from the terminal device 2. Specifically, the video output part 301 obtains the identification information SI representing the low-quality video data LM from the identification information acquisition part 301. The video output part 302 obtains from the storage unit 31 the high-quality video data HM corresponding to the identification information SI representing the low-quality video data LM acquired from the identification information acquisition part 301. The video output part 302 outputs the high-quality video data HM, which is obtained from the storage unit 31, to the video acquisition part 205.

(Step S110) The terminal device 2 receives the high-quality video data HM from the video data distribution device 3. Specifically, the video acquisition part 205 acquires the high-quality video data HM from the video output part 302.

Summary of First Embodiment

As described above, the video distribution system 100 of the present embodiment distributes to the terminal device 2 the high-quality video data HM corresponding to the low-quality video data LM selected by the terminal device 2. The terminal device 2 selects the low-quality video data LM as the video data having a smaller amount of data than the high-quality video data HM. In this connection, the low-quality video data LM indicates the low-quality video data LM selected by the user. For this reason, the video distribution system 100 allows the user to select the desired high-quality video data HM by providing the user with the video data having a small amount of data. Accordingly, the video distribution system 100 may distribute the high-quality video data HM, which corresponds to the video data having a small amount of data selected by the user, to the terminal device 2.

Therefore, according to the video distribution system 100 of the present embodiment, it is possible to distribute a large amount of content to the terminal device 2.

The aforementioned descriptions refer to the high-quality video data HM as the video data having a higher picture quality than the low-quality video data LM; but this is not a restriction. The high-quality video data HM should be a video made out of the original video OM. Specifically, the high-quality video data HM may be the video data having a higher sound quality than the low-quality video data LM. Alternatively, the high-quality video data HM may be the video data having a lower compressibility of video than the low-quality video data LM. The high-quality video data HM may represent an image having a different aspect of pixel sizes than the low-quality video data LM. The high-quality video data HM may represent a CG (Computer Graphic) video made out of the original video OM. Moreover, the high-quality video data HM may represent the original video OM.

The aforementioned descriptions refer to the video data distribution device 3 in which the high-quality video data HM is stored on the storage unit 31 in advance; but this is not a restriction. The video data distribution device 3 may obtain the high-quality video data HM from another device such as a server device configured to generate the high-quality video data HM out of the original video OM. Alternatively, after receiving the identification information SI from the terminal device 2, the video data distribution device 3 may generate the high-quality video data HM. In this case, the video output part 302 may carry out image processing such as compression with respect to the original video OM corresponding to the identification information acquired from the identification information acquisition part 301, and then the video output part 302 may generate and output the high-quality video data HM to the video acquisition part 205.

The aforementioned descriptions refer to the low-quality video data LM which is stored on the storage unit 23 in advance; but this is not a restriction. As described above, the low-quality video data LM may be polygon-moving images generated by the terminal device 2. In this case, it is unnecessary to store the low-quality video data LM on the storage unit 23 in advance. The terminal device 2 generates the identification information SI base on the motion information and the model information used to generate polygon-moving images, which are obtained from the video data distribution device 3 and stored on the storage unit 23 in advance. In this connection, the data used to generate polygon-moving images has a smaller amount of data than the high-quality video data HM. Accordingly, it is possible for the terminal device 2 to store a large amount of data therein.

In addition, the terminal device 2 is configured to receive the high-quality video data HM based on polygon-moving images.

Second Embodiment

Next, a video distribution system of the second embodiment will be described with reference to the drawings. The video distribution system of the second embodiment is designed to supply the high-quality video data HM, which is based on the setting designated by a terminal device, from a video data distribution device to a terminal device.

Figure 5:
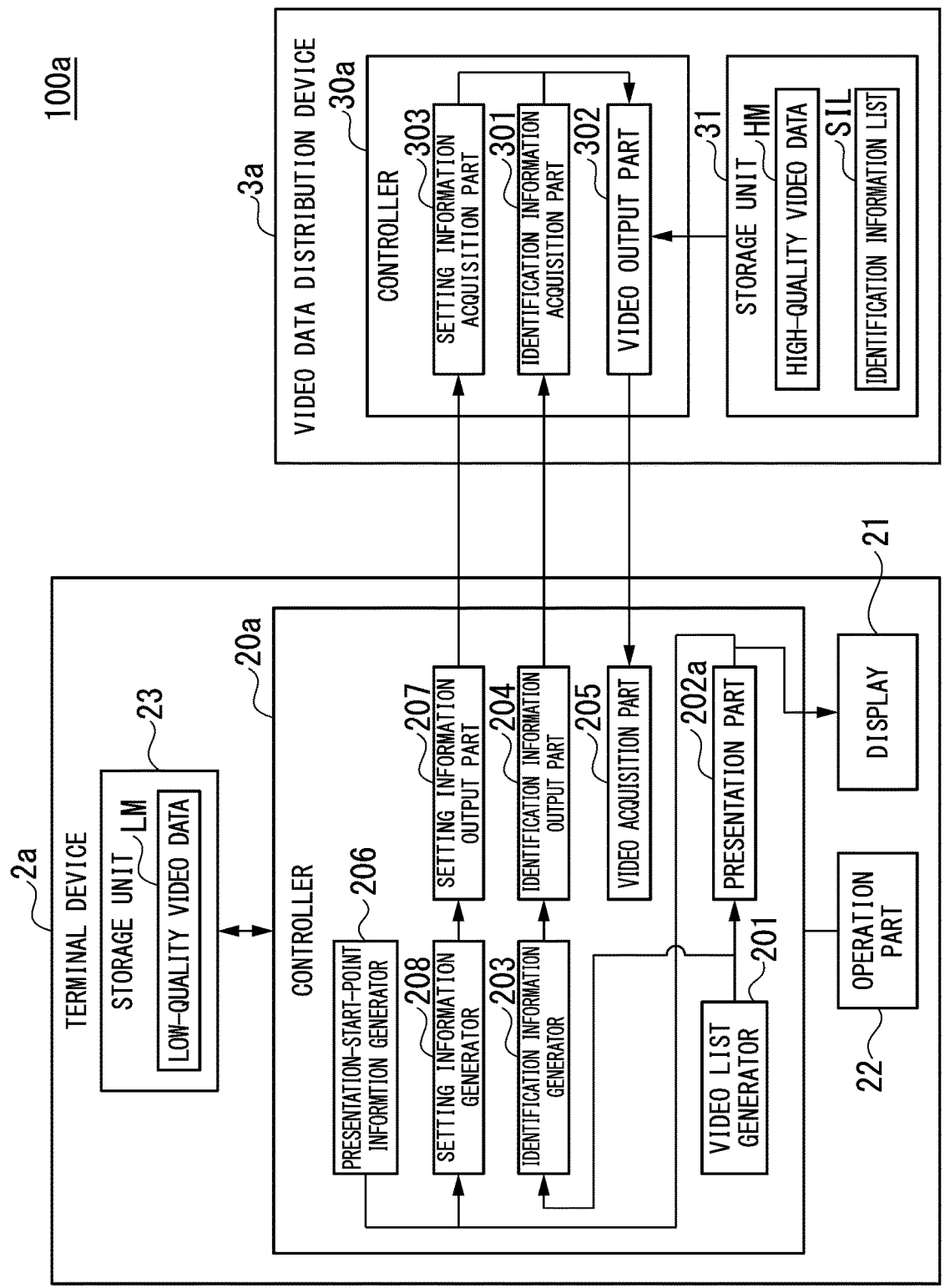
FIG. 5 is a block diagram showing a video distribution system according to the second embodiment.

FIG. 5 is a block diagram showing an example of a functional configuration of a video distribution system 100a of the second embodiment.

The video distribution system 100a differs from the first embodiment in that a terminal device 2a has a function to generate the setting information representing the setting of the high-quality video data HM.

Hereinafter, functions will be described below. In this connection, the same configuration and the same operation as the first embodiment will be described using the same reference signs; hence, their descriptions will be omitted here.

<Function to Generate Setting Information>

The terminal device 2a includes a controller 20a further including functional parts such as a setting information generator 208, a presentation-start-point information generator 206, a setting information output part 207, and a presentation part 202a.

The setting information generator 208 is configured to generate the setting information representing the setting of the high-quality video data HM.

The presentation-start-point information generator 206 is configured to generate the presentation-start-point information representing the start point to present the high-quality video data HM in the original video data OM. Herein, the start point represents the time to start presentation within the total presentation time of the high-quality video data HM. The setting information generator 208 is configured to generate the setting information including the presentation-start-point information generated by the presentation-start-point information generator 206.

The setting information output part 207 outputs the setting information to the identification information generator 203. The video acquisition part 205 acquires the high-quality video data HM subsequent to its start point.

The presentation part 202a presents the video data to the display 21.

The video data distribution device 3a includes a controller 30a further including a setting information acquisition part 303 as its functional part.

The setting information acquisition part 303 acquires the setting information from the setting information output part 207. The setting information acquisition part 303 supplies the setting information, which is acquired from the setting information output part 207, to the video output part 302.

The video output part 302 outputs the high-quality video data HM, which corresponds to the setting information acquired by the setting information acquisition part 303, to the video acquisition part 205. Specifically, the video output part 302 obtains the identification information SI and the high-quality video data HM corresponding to the setting information from the storage unit 31. The video output part 302 outputs the identification information SI obtained from the storage unit 31 and the high-quality video data HM corresponding to the setting information to the video acquisition part 205.

Now, the setting information generated by the setting information generator 208 will be described with reference to FIG. 6.

Figure 6:
FIG. 6 shows a table describing an example of setting information in the second embodiment.

FIG. 6 is a table describing an example of setting information MSI.

The setting information MSI includes various pieces of information such as a picture quality of video, a sound quality, a start point, and an end point with respect to the high-quality video data HM. The end point indicates the time to end presentation within the total presentation time of the high-quality video data HM.

When the presentation part 202a generates the presentation-start-point information while presenting the low-quality video data LM, the presentation part 202a replaces the low-quality video data LM currently at presentation with the high-quality video data HM subsequent to the presentation-start point indicated by the presentation-start-point information. In this case, the presentation-start-point information indicates the start point corresponding to the presentation point of the low-quality video data LM currently presented by the presentation part 202a.

Figure 7A:
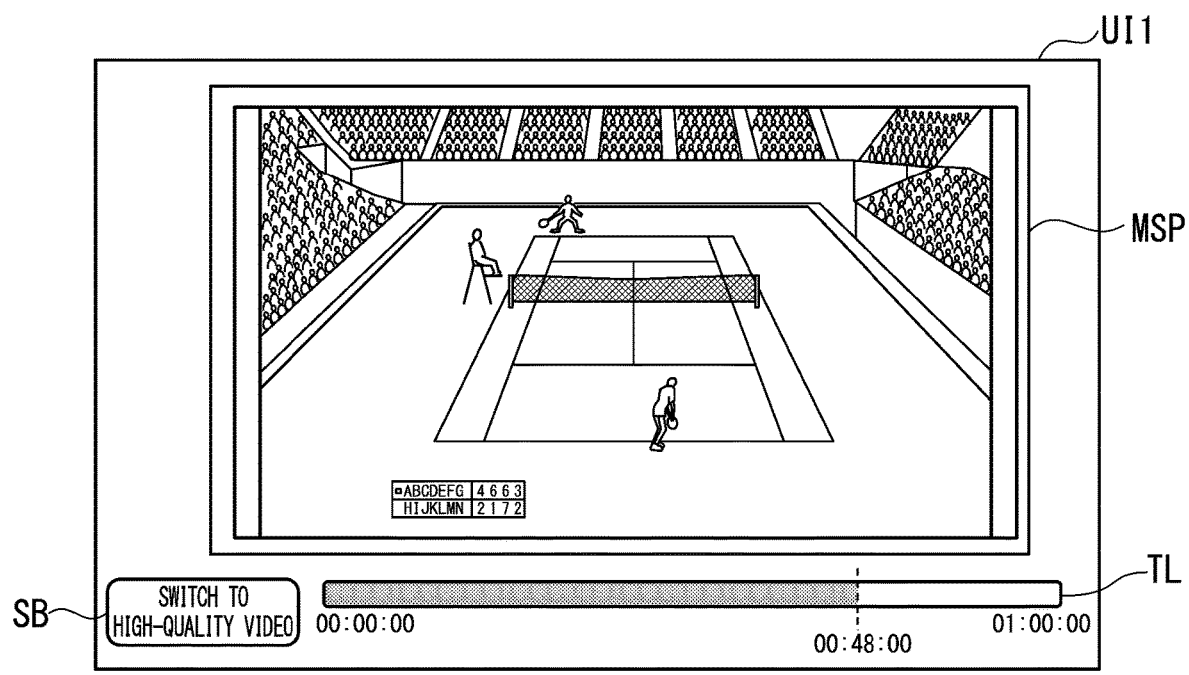
FIG. 7A shows a display screen used to generates presentation-start-point information displayed on a display in the second embodiment with respect to an example of low-quality video data.
Figure 7B:
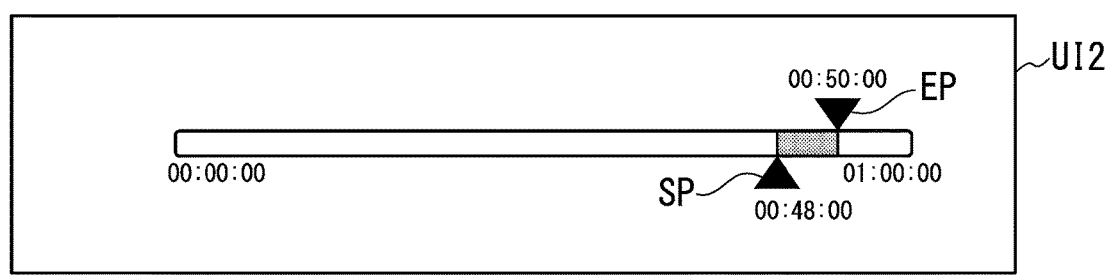
FIG. 7B shows a display screen used to generate presentation-start-point information displayed on a display in the second embodiment with respect to an example of an image used to set a start point and an end point.

FIGS. 7A and 7B are image diagrams showing an example of display screens used to generate the presentation-start-point information displayed on the display 21.

FIG. 7A is an image diagram showing an example of the low-quality video data LM selected by the user, which is displayed on the display 21.

FIG. 7A shows an image UI1 including a presentation part MSP, a time line TL representing the presentation point of the video data currently at presentation, and a video-data-switching button SB.

The low-quality video data LM selected by the user is displayed in the presentation part MSP shown in FIG. 7A. In this example, the low-quality video data LM represents a video of a game held in a stadium. In addition, "01:00:00" representing the total presentation time of the low-quality video data LM selected by the user is displayed in the time line TL. In addition, "00:48:00" is displayed as the presentation point of data currently at presentation. This number represents a video at a time point of forty-eight minutes within the video data having the total presentation time of one hour.

When the user touches the video-data-switching button SB, the presentation-start-point information generator 206 detects a user's touch operation to generate the presentation-start-point information indicating the presentation start point of "48:00" and the presentation end point of "01:00:00". The video data distribution device 3a acquires the setting information MSI including the presentation-start-point information so as to distribute to the terminal device 2a the high-quality video data HM subsequent to the presentation start point indicated by the presentation-start-point information. The presentation part 202a switches over video data from the low-quality video data LM currently at presentation to the high-quality video data HM subsequent to the presentation start point indicated by the presentation-start-point information.

In this connection, the end point of "01:00:00" may not be necessarily included in the presentation-start-point information. When the presentation-start-point information does not include the presentation end point, the video acquisition part 205 needs to acquire the video data up to the ending point in the total presentation time.

FIG. 7B shows an example of an image UI2 used to set the start point and the end point.

The presentation-start-point information generator 206 may generate the presentation-start-point information including a range of points specified by a start point SP and an end point EP.

In the presentation-start-point information shown in FIG. 7B, the presentation part 202a may switch to the low-quality video data LM to continue its presentation after ending the presentation of the high-quality video data HM up to the presentation end point of "00:50:00". Alternatively, the presentation part 202a may present the high-quality video data HM up to the presentation end point of "00:50:00", and then after ending the presentation, the presentation part 202a may notify the user of the ending of presentation.

Next, a method how to generate the setting information MSI representing the picture quality and the sound quality of the high-quality video data HM will be described with reference to FIG. 8.

Figure 8:
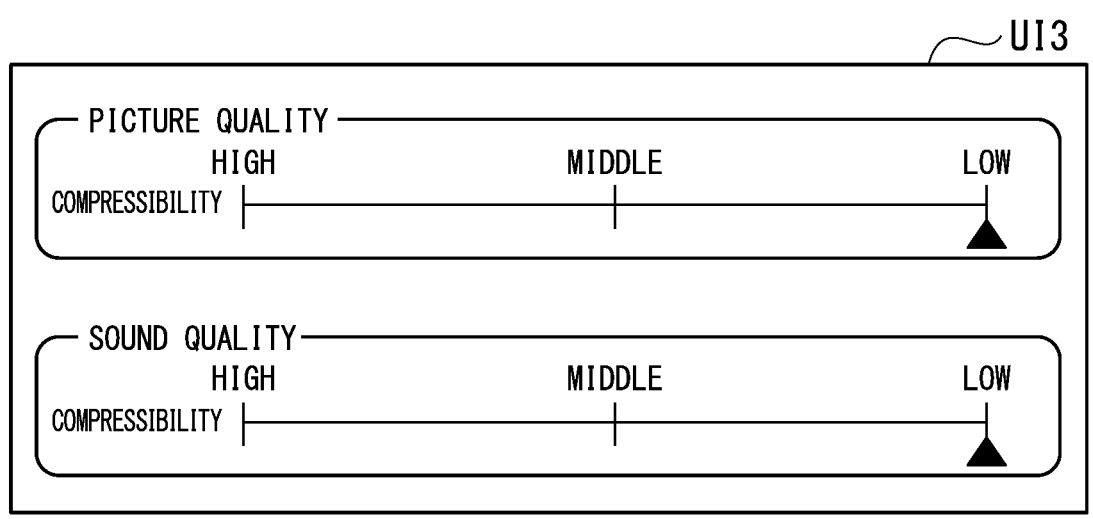
FIG. 8 is an image diagram showing an example of a display screen used to generate the setting information displayed on the display in the second embodiment.

FIG. 8 shows an example of a display screen used to generate the setting information MSI displayed on the display 21.

In the present embodiment, the picture quality and the sound quality included in the setting information MSI are each designated using compressibility. A higher compressibility leads to a reduction of the picture quality and the sound quality of the high-quality video data HM compared to the picture quality and the sound quality of the original video OM. A lower compressibility leads to an improvement of the picture quality and the sound quality to reduce a difference between the high-quality video data HM and the original video OM in terms of the picture quality and the sound quality.

Summary of Second Embodiment

As described above, the video distribution system 100a of the present embodiment is designed to distribute to the terminal device 2a the high-quality video data HM according to the setting indicated by the setting information MSI. It is possible to change the setting information MSI with a user operation applied to the terminal device 2a. That is, the user may obtain the high-quality video data HM having the desired setting.

The setting information MSI includes the presentation-start-point information. Accordingly, it is possible to change the start point to acquire the high-quality video data HM. In addition, the presentation part 202a may change the video data at presentation from the low-quality video data LM to the high-quality video data HM when the setting information MSI including the presentation-start-point information is generated during presentation of the low-quality video data LM. Accordingly, the user viewing the low-quality video data LM may enjoy the high-quality video data HM without any interruption in viewing the video data.

When the setting information MSI includes the presentation-end point, it is possible to distribute partial content within a large amount of content. To distribute moving-image content such as a recording a soccer game, for example, the video distribution system 100a may distribute part of moving images captured from a scene of a shot being taken at the goal to the terminal device 2a as the high-quality video data HM. When the setting information MSI is generated during the presentation of the low-quality video data LM, the terminal device 2a determines whether or not the high-quality video data HM corresponding to the setting information MSI is stored on the storage unit 23.

When the high-quality video data HM is stored on the storage unit 23, the terminal 2a presents the high-quality video data HM stored on the storage unit 23. When the high-quality video data HM corresponding to the setting information MSI is not stored on the storage unit 23, the terminal device 2a requests the video data distribution device 3a to distribute the high-quality video data HM corresponding to the setting information MSI. In this case, the terminal device 2a may notify the user of a distribution request of the high-quality video data HM to be supplied to the video data distribution device 3a, whereby the terminal device 2a may supply the distribution request to the video data distribution device 3a upon receiving a user's approval.

The aforementioned setting information MSI may includes a setting to designate the player information, the information representing the type information of wireless communication, and the terminal information For example, the setting to designate the player information is to designate a video capturing a player in the original video OM. As the setting, for example, it is possible to designate a still image of a player or the like. The video distribution system 100a distributes to the terminal device 2a a partial video capturing the designated player in the original video OM as the high-quality video data HM. In this case, the video data distribution device 3a selects a video capturing a player based on the information included in a still image of a player such as the design of a player's uniform, the uniform number, and player's physical characteristics.

The type information of wireless communication relates to wireless communication used for communication between the terminal device 2a and the video data distribution device 3a, for example, it may be wireless-communication-type information representing a wireless LAN or an LTE, communication quality information representing a communication throughput, or the like. In this case, the video distribution system 100a is configured to distribute the high-quality video data HM having the picture quality according to wireless-communication speed and communication quality based on the type information of wireless communication.

The terminal information includes the performance information of the terminal device 2a. The performance of the terminal device 2a such as the processing speed and the presentation environment depends on the type of an arithmetic unit installed in the terminal device 2a, the operating frequency, the access speed and the capacity of memory, the type and the operating frequency of an image-processing engine, and the like. For example, the terminal information may include the information of an operating system, the device-type information, the name of an application used to present video data, the information representing a decoder configured to decode video data, the information representing the performance and the type of a CPU, the information representing the number of pixels of a display (or the resolution information), the information representing the size of a display, and the like. In this case, the video distribution system 100a is configured to distribute the high-quality video data HM according to the processing speed of the terminal device 2a and the presentation environment of the high-quality video data HM. In this case, the video data distribution device 3a is equipped with the storage unit 31 configured to store various pieces of information included in the terminal information and its corresponding high-quality video data HM. The video data distribution device 3a distributes to the terminal device 2a the high-quality video data HM, which corresponds to the terminal information acquired from the terminal device 2a, among a plurality of high-quality video data HM stored on the storage unit 31. That is, the video data distribution device 3a is configured to selectively distribute the high-quality video data HM suited to the terminal device 2a according to the terminal information acquired from the terminal device 2a.

In addition, the storage unit 31 of the video data distribution device 3a is configured to store the setting information MSI, which corresponds to the high-quality video data HM distributed to the terminal device 2a in the past, in connection with the terminal identification information used to identify the terminal device 2a. Upon receiving a distribution request of the high-quality video data HM precluding the setting information MSI from the terminal device 2a with its storage unit configured to store the terminal identification information, the video data distribution device 3a distributes to the terminal device 2a the high-quality video data HM based on the setting information MSI which is stored in connection with the terminal identification information. Upon receiving a distribution request of the high-quality video data HM accompanied with the setting information MSI from the terminal device 2a with its storage unit configured to store the terminal identification information, the video data distribution device 3a stores the newly-received setting information MSI in connection with the terminal identification information, thus distributing the high-quality video data HM based on the newly-received setting information MSI.

Third Embodiment

Next, a video distribution system according to the third embodiment will be described with reference to the drawings. The video distribution system of the third embodiment is designed such that a video data distribution device is configured to distribute the high-quality video data HM, which is set with respect to a viewpoint of capturing a video, to a terminal device.

Figure 9:
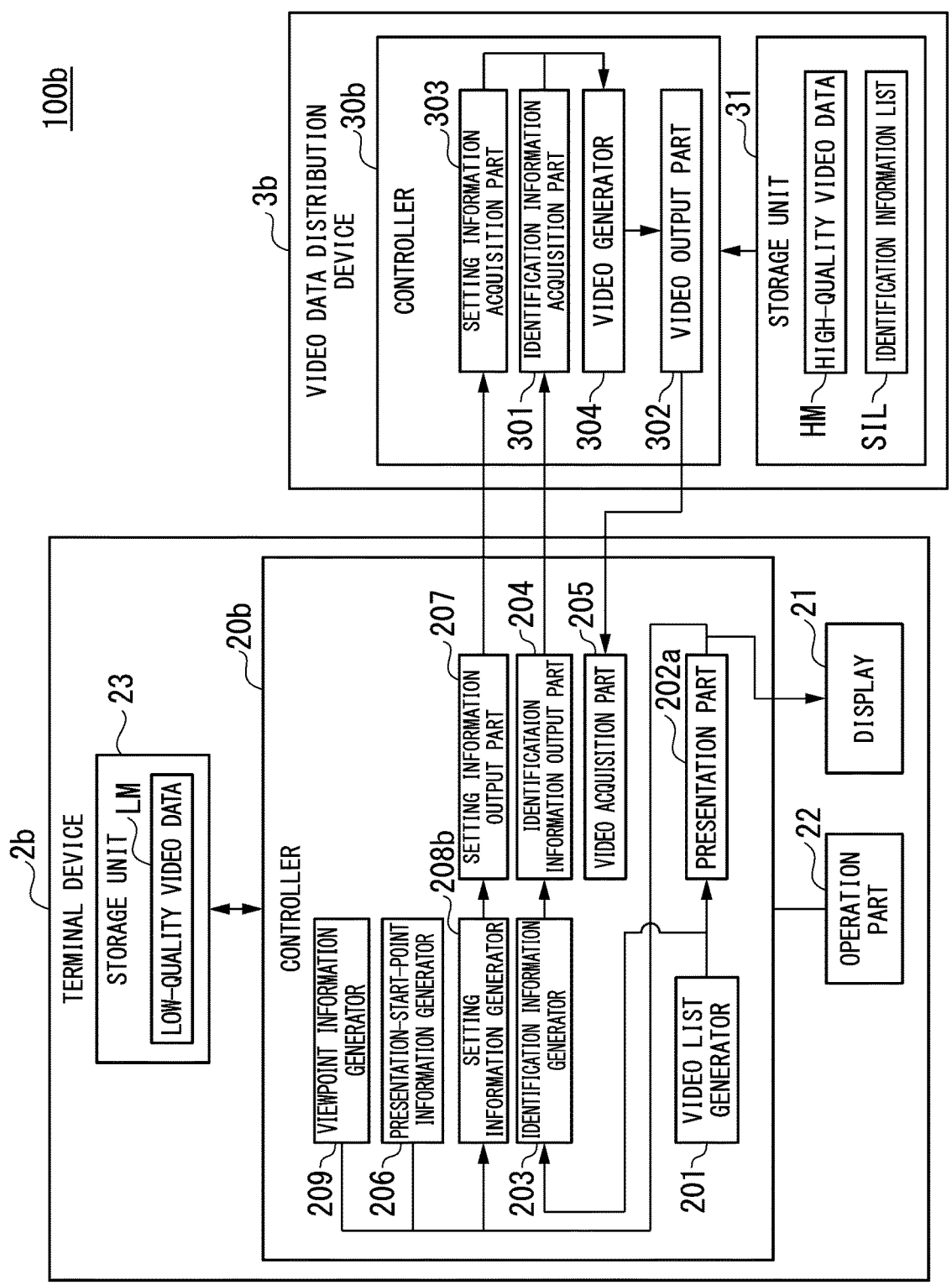
FIG. 9 is a block diagram showing a video distribution system according to the third embodiment.

FIG. 9 is a block diagram showing an example of a functional configuration of a video distribution system 100b according to the third embodiment.

The video distribution system 100b differs from the second embodiment in that a terminal device 2b is configured to generate the viewpoint information representing a viewpoint of capturing the high-quality video data HM.

The video data distribution device 3b transmits the high-quality video data HM captured at camera positions indicated by the viewpoint information. The high-quality video data HM may correspond to CG video data produced based on the original video OM which is captured by cameras disposed at different positions. In the following descriptions, the CG video data will be referred to as a free-viewpoint video. The free-viewpoint video is an example of third video data. The free-viewpoint video is a three-dimensional video which is produced using a multiple-viewpoint video, i.e. a video captured at multiple positions. For example, the user may designate a viewpoint position and a viewpoint angle for a free-viewpoint video so as to enjoy viewing a video which can be switched to a desired video captured at a desired position and in a desired angle. The viewpoint information may include the viewpoint position and the viewpoint angle for the free-viewpoint video. The free-viewpoint video is a video corresponding to a viewpoint indicated by the viewpoint information and produced based on the viewpoint information and the original video OM.

The video output part 302 outputs the free-viewpoint video to the terminal device 2b as the high-quality video data HM.

Hereinafter, the functions will be described below. In this connection, the same configurations and the same operations as the first and second embodiments will be denoted using the same reference signs; hence, the descriptions thereof will be omitted here.

<Function to Generate Viewpoint Information>

The terminal device 2b includes a controller 20b further including a viewpoint information generator 209 as its functional part.

The viewpoint information generator 209 generates the viewpoint information.

Now, the viewpoint information will be described with reference to FIG. 10.

The viewpoint information includes a position of a camera designated by the low-quality video data LM and an image-capturing direction of a camera. In the following descriptions, the camera will be referred to as a virtual camera as necessary. In the following descriptions, a position of a virtual camera and an image-capturing direction of a virtual camera will be collectively referred to as a viewpoint as necessary.

Figure 10:
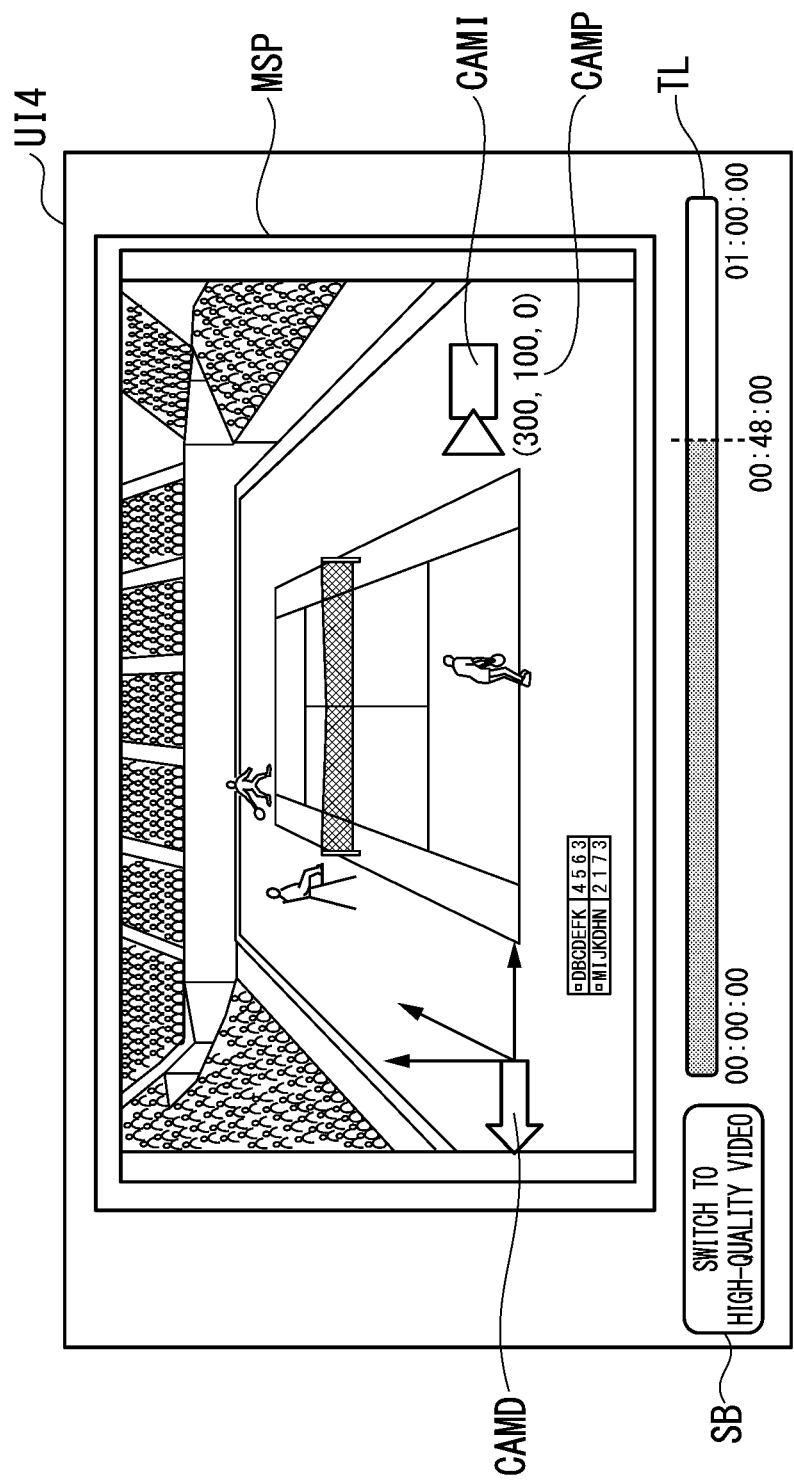
FIG. 10 is an image diagram showing an example of an image used to set viewpoint information in the third embodiment.

FIG. 10 is an image diagram showing an example of an image UI4 used to set the viewpoint information.

The presentation part MSP may include a virtual camera CAMI, a value CAMP representing the position of a virtual camera, and an axis CAMD representing an image-capturing direction of a virtual camera. Herein, the value CAMP is set using a Z-axis in a normal direction to a predetermined plane of a free-viewpoint video, i.e. a plane in which an X-axis is perpendicular to a Y-axis. In this example, the predetermined plane corresponds to the ground of a stadium, wherein a virtual camera is located at the position indicated by three values, i.e. 300 in the X-axis, 100 in the Y-axis, and 0 in the Z-axis. In this example, the axis CAMD lies in the negative side of the X-axis. The user who operates the terminal device 2a may input the value CAMP and the axis CAMD, and therefore the viewpoint information includes the value CAMP and the axis CAMD.

Now, an example of a user operation to input the value CAMP and the axis CAMD will be described below. In this example, the low-quality video data LM may correspond to the aforementioned polygon-moving image. As described above, the polygon-moving image is a three-dimensional CG moving image which is produced by moving the model information, which is produced by modeling an image of a player, according to the motion information. The polygon-moving image is a three-dimensional CG moving image. Accordingly, it is possible to allocate the virtual camera CAMI at a desired viewpoint. By setting the viewpoint information as a viewpoint of the virtual camera CAMI which is set by the polygon-moving image serving as the low-quality video data LM, the user may request the video data distribution device 3b to distribute the high-quality video data HM representing a video captured at a desired viewpoint. Accordingly, it is possible for the video data distribution device 3b to distribute to the terminal device 2b the high-quality video data HM captured at a desired viewpoint by the user.

Returning back to FIG. 9, the viewpoint information generator 209 generates and supplies the viewpoint information to a setting information generator 208b. The setting information generator 208b generates the setting information MSI including the viewpoint information.

The setting information acquisition part 303 acquires the setting information MSI including the viewpoint information from the setting information output part 207. The setting information acquisition part 303 supplies the setting information MSI including the viewpoint information, which is acquired from the setting information output part 207, to the video generator 304. The identification information acquisition part 301 supplies the identification information SI to the video generator 304.

The video generator 304 acquires the setting information MSI including the viewpoint information from the setting information acquisition part 303. The video generator 304 acquires the identification information SI from the identification information acquisition part 301. The video generator 304 generates a free-viewpoint video based on the setting information MSI including the viewpoint information acquired from the setting information acquisition part 303 and the identification information SI acquired from the identification information acquisition part 301. Specifically, the video generator 304 generates a free-viewpoint video out of a plurality of original videos OM indicated by the identification information SI based on the viewpoint information indicated by the setting information MSI.

The video generator 304 generates and supplies the free-viewpoint video to the video output part 302.

The video output part 302 outputs to the video acquisition part 205 the free-viewpoint video according to the setting information MSI acquired by the setting information acquisition part 303.

Summary of Third Embodiment

As described above, the video distribution system 100b of the present embodiment is designed to distribute a free-viewpoint video, which is captured at the position indicated by the viewpoint information, to the terminal device 2b. The user may operate the terminal device 2a to change the setting information MSI including the viewpoint information. That is, the user may obtain a free-viewpoint video captured at a desired position.

The above descriptions refer to a free-viewpoint video as a CG video; but this is not a restriction. When the position of a camera indicated by the viewpoint information is close to the position of a camera configured to capture the original video OM, it is possible to provide the original video OM captured by the camera as the free-viewpoint video. Alternatively, the viewpoint information may simply specify a single camera among a plurality of cameras configured to capture the original video OM. In this case, the video distribution system 100b is configured to transmit the original video OM captured by a camera specified by the viewpoint information.

The above descriptions refer to the video generator 304 configured to generate the free-viewpoint video; but this is not a restriction. It is possible to modify the video data distribution device 3b such that the free-viewpoint video is generated in advance and stored on the storage unit 31. When the video generator 304 is configured to generate a free-viewpoint video, it is possible to store on the storage unit 31 the viewpoint position indicated by the viewpoint information in connection with the free-viewpoint video. Accordingly, upon receiving a request of distributing a free-viewpoint video which was already generated at the viewpoint position, it is possible for the video data distribution device 3b to supply the free-viewpoint video to the terminal device 2b in a short period of time.

The aforementioned setting information MSI may include the position information and the terminal information of the terminal device 2b. The position information of the terminal device 2b represents the position of the terminal device 2b when receiving or presenting the low-quality video data LM from the video data distribution device 3b. For example, the position information may include the position information representing the presentation position, the identification information for identifying an access point of a wireless LAN communicating with the terminal device 2b, the identification information for identifying a base station of a mobile communication network, or the like. The video distribution system 100b may determine whether or not to distribute the high-quality video data HM to the terminal device 2b based on the position information.

The video data distribution device 3b may generate the high-quality video data HM based on the position information instead of the viewpoint information included in the setting information MSI. Specifically, when the identification information for identifying an access point of a wireless LAN included in the setting information MSI indicates a spectator's seat at a specific position in a stadium, for example, the video data distribution device 3b may generate a free-viewpoint video at the spectator's seat located at the viewpoint position, thus distributing the free-viewpoint video to the terminal device 2b.

For example, the terminal identification information may be an electronic-ticket ID used for admission of a sports game. In this case, the video distribution system 100a is able to distribute the high-quality video data HM to the terminal device 2a held by a user who comes to a sports game. In addition, the video data distribution device 3b may distribute the high-quality video data HM according to the type of an electronic-ticket ID. For example, the video data distribution device 3b may differentiate the high-quality video data HM to be distributed to the terminal device 2b according to the selling price of an electronic-ticket ID or the type of tickets which allows for multiple-times usage within a predetermined period of time.

In addition, the video data distribution device 3b may generate a free-viewpoint video based on the electronic-ticket ID. Specifically, when the electronic-ticket ID is used to specify the position of a spectator's seat in a stadium, as described above, the video data distribution device 3b may generate a free-viewpoint video at the viewpoint position corresponding to the position of a spectator's seat, thus distributing the free-viewpoint video to the terminal device 2b. Accordingly, it is possible to present on the terminal device 2b the same video as the video viewed by the owner of the terminal device 2b in a stadium.

When the video distribution system 100b distributes the high-quality video data HM solely to the terminal device 2b located in a stadium, the terminal device 2b having stored therein an electronic-ticket ID may transmit to the video data distribution device 3b the setting information MSI including the electronic-ticket ID and the identification information for identifying an access point of a wireless LAN located in a stadium. Upon receiving the electronic-ticket ID and the identification information for identifying an access point, the video data distribution device 3b determines that the terminal device 2b is located in a stadium and thereby distribute the high-quality video data HM corresponding to the electronic-ticket ID to the terminal device 2b.

In this connection, the video acquisition part according to the first to third embodiments may acquire the high-quality video data HM as streaming video data. In this case, the video output part distributes the high-quality video data HM by way of streaming. Accordingly, the video distribution system is able to distribute the high-quality video data HM without considering the capacity of a storage unit in a terminal device. Upon acquiring the streaming video data, the terminal device can reduce a wait time to wait for the presentation of the high-quality video data HM.

The terminal device according to the first and second embodiments may further include a settlement part and a settlement information output part.

The settlement part is configured to settle the payment of the high-quality video data HM. Specifically, the settlement part settles the payment of the high-quality video data HM with an unillustrated settlement server. For example, the settlement part may settle the amount of payment which is determined based on the total presentation time of the high-quality video data HM or the number of times to present the high-quality video data HM. To acquire the high-quality video data HM as the streaming video data, the settlement part may settle the amount of payment which is determined based on the time to acquire the streaming video data. When the video data distribution device 3b distributes the streaming video data to the terminal device 2b, it is possible to install the settlement part and the settlement information output part in the video data distribution device 3b rather than the terminal device 2b.

The settlement information output part outputs to the video data distribution device the settlement information representing the result of settlement made by the settlement part. The video data distribution device may further distribute the high-quality video data HM based on the settlement information. In this connection, the settlement information may be included in the setting information MSI.

In the foregoing embodiments, the terminal device 2, the terminal device 2a, the terminal device 2b, the video data distribution device 3, the video data distribution device 3a, and the video data distribution device 3b include various parts which can be embodied using exclusive-use hardware or using memory and microprocessors.

The terminal device 2, the terminal device 2a, the terminal device 2b, the video data distribution device 3, the video data distribution device 3a, and the video data distribution device 3b include various parts configured of memory and CPUs (Central Processing Units), and therefore it is possible to achieve the functions of various parts realized in the terminal device 2, the terminal device 2a, the terminal device 2b, the video data distribution device 3, the video data distribution device 3a, and the video data distribution device 3b by loading and executing programs achieving their functions.

Programs achieving the functions of various parts installed in the terminal device 2, the terminal device 2a, the terminal device 2b, the video data distribution device 3, the video data distribution device 3a, and the video data distribution device 3b can be stored on computer-readable storage media, and therefore it is possible to achieve the foregoing processes with a computer system to load and execute programs stored on storage media. Herein, the term "computer system" may embrace an OS and hardware such as peripheral devices.

The term "computer system" using the WWW system may include homepage-providing environments (or display environments).

In addition, the term "computer-readable storage media" may refer to flexible disks, magneto-optical disks, ROM, portable media such as CD-ROM, storage devices such as hard disks embedded in computer systems. Moreover, the term "computer-readable storage media" may include any measures configured to dynamically hold programs for a short period of time like networks such as the Internet and communication lines for transmitting programs through communication lines such as telephone lines and other measures configured to hold programs for a certain period of time like non-volatile memory embedded in a computer system serving as a server or a client. The aforementioned programs may achieve part of the foregoing functions, or they can be combined with programs pre-installed in a computer system so as to achieve the foregoing functions.

Fourth Embodiment

Hereinafter, an information distribution system 1001 according to the fourth embodiment will be described with reference to the drawings.

Figure 11:
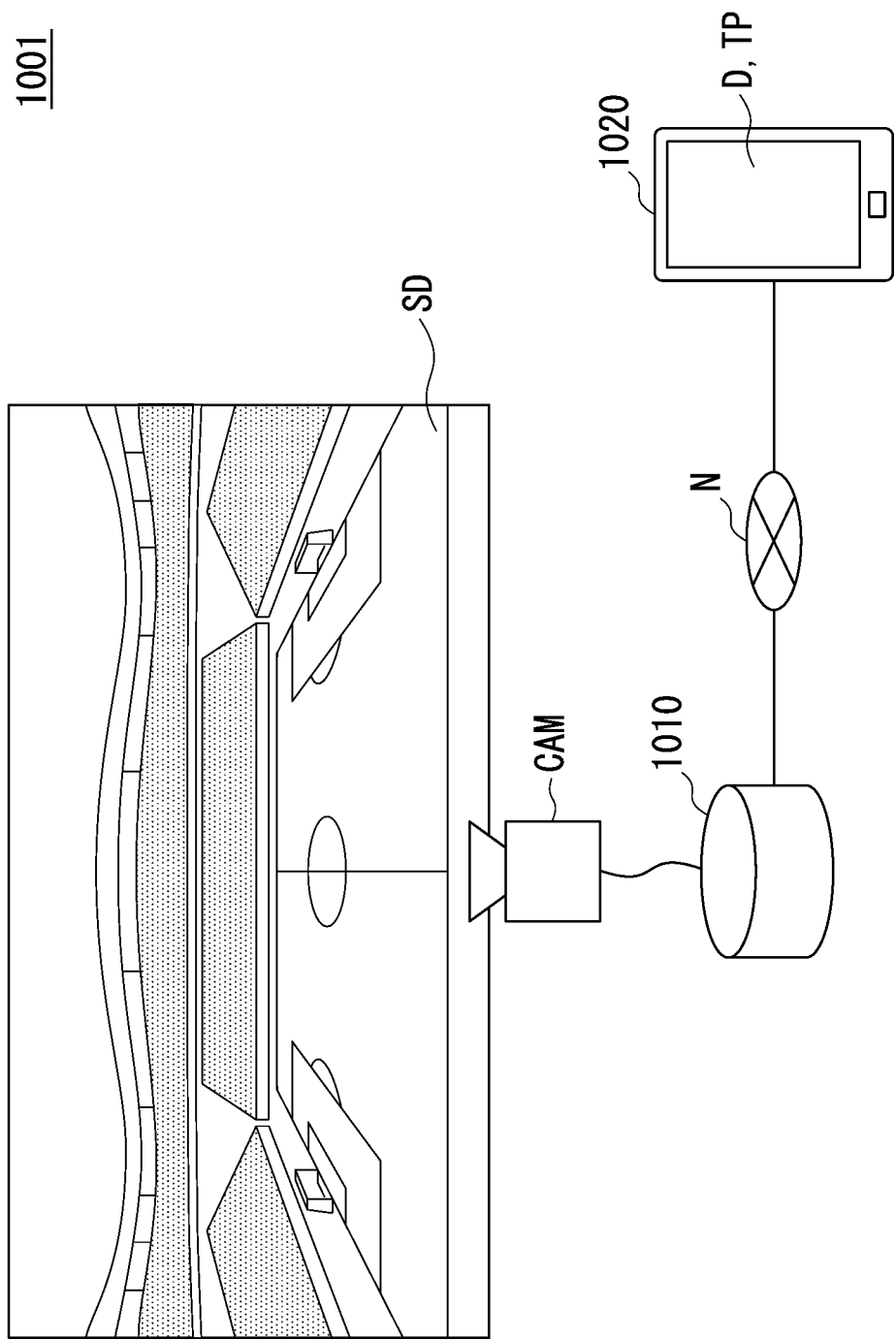
FIG. 11 is a schematic diagram showing the configuration of an information distribution system according to the fourth embodiment.

FIG. 11 is a schematic diagram showing an outline configuration of the information distribution system 1001 of the fourth embodiment.

<Outline of System>

The information distribution system 1001 includes an information distribution device 1010. The information distribution device 1010 is connected to a terminal device 1020 through a network N.

The information distribution device 1010 is configured to carry out image processing of video data VD captured by an imaging device CAN, thus distributing the image-processed information to the terminal device 1020. Hereinafter, an example of an operation to distribute the information of a soccer game will be described with respect to the information distribution system 1001 located in a soccer-game stadium SD. In this connection, the present embodiment will be described with respect to a single imaging device CAM.

For example, the terminal device 1020 is a smartphone or a table terminal, which is equipped with a display D and an operation part TP. For example, the operation part TP is equipped with a touch panel to be operated by a user of the terminal device 1020. For example, the display D is equipped with a liquid-crystal display configured to display various images. An image generated by the terminal device 1020 based on the distributed information of the information distribution device 1010 may be included in images displayed on the display D.

Herein, an example of the distributed information of the information distribution device 1010 will be described with reference to FIGS. 12A, 12B, and 12C.

Image Example Displayed on Terminal Device 1020

Figure 12A:
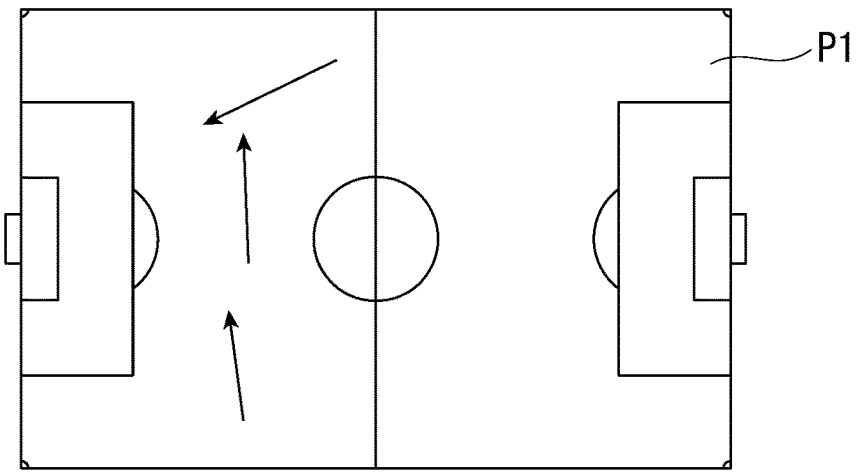
FIG. 12A is an image diagram showing an example of an image to be displayed on a display of a terminal device according to the fourth embodiment.
Figure 12B:
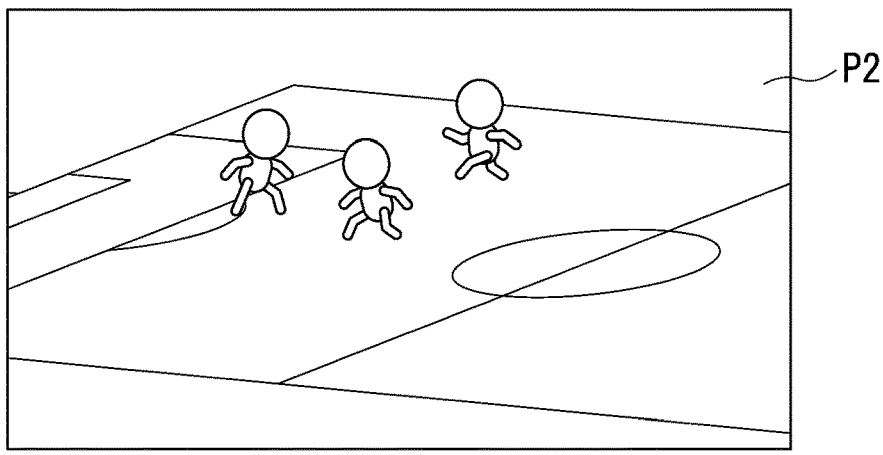
FIG. 12B is an image diagram showing another example of an image to be displayed on the display of the terminal device according to the fourth embodiment.
Figure 12C:
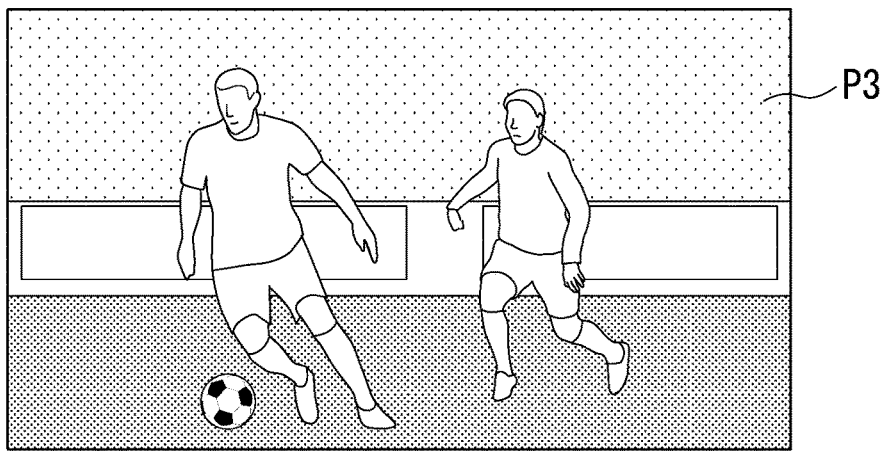
FIG. 12C is an image diagram showing a further example of an image to be displayed on the display of the terminal device according to the fourth embodiment.

FIGS. 12A, 12B, and 12C show an example of an image P displayed on the display D of the terminal device 1020 of the present embodiment.

FIG. 12A shows an image P1 depicting traces representing players' movements in the stadium SD overlooked at a height in the air.

FIG. 12B shows an image P2 depicting the deployment of players observed at a certain viewpoint. In the image P2, players are each displayed in a deformed manner using a combination of relatively simple figures such as a sphere and a cylinder.

FIG. 12C shows an image P3 showing the deployment of players observed at a certain viewpoint. In the image P3, players are each made of a combination of polygonal shapes (e.g. polygons), which is displayed by way of a shading process in a beaming direction and texture mapping on the polygonal surface.

The images P2 and P3 differ from each other in terms of an image-information volume. The image-information volume may be determined based on the size of an image, the resolution of an image, and the number of gradations in a color tone as well as the number of motion vectors used to generate moving images. For example, the expression of "a large image-information volume" indicates a high density of motion vectors used to generate moving images or a high frequency of updating motion vectors. In this example, the image P3 includes a larger number of polygons than the image P2, and therefore the image P3 may smoothly depict players' movements. In this example, the density of motion vectors used to generate the image P3 is higher than the density of motion vectors used to generate the image P2. That is, the image P2 has a relatively small information volume. The image P3 includes a relatively large information volume. In the following descriptions, an image having a relatively large information volume will be referred to as "a fine-granularity image". On the other hand, an image having a relatively small information volume will be referred to as "a rough-granularity image".

<Adjustment of Image-Information Volume Displayed on Terminal Device 1020>

The granularity of the image P displayed on the display D of the terminal deice 1020 depends on various factors. As factors, for example, it is possible to mention (1) the image-processing performance of the information distribution device 1010, (2) the image-processing performance of the terminal device 1029, (3) the quality of communication between the information distribution device 1010 and the terminal device 1020, (4) the upper-limit value of communication and the communication speed based on the content of a communication-line contract with the terminal device 1020, (5) a request of a user of the terminal device 1020, and the like. When the information distribution device 1010 or the terminal device 1020 demonstrates a relatively high image-processing performance, for example, it is possible to display the image P having a fine granularity.

<Generation of Moving Image Using Model and Motion Image of Model>

The image distribution device 1010 carries out the image processing of the video data VD captured by the imaging device CAN so as to extract an image of a player included in the video data VD. In addition, the image distribution device 1010 carries out the image processing with respect to the extracted image of a player and calculates the skeleton of a player and its center of gravity, thus modeling an image of a player.

When the model information representing the skeleton of a player is stored on the terminal device 1020 in advance, it is possible for the terminal device 1020 to generate a moving image of a model by applying the motion information to the model information.

In this case, the image distribution device 1010 distributes the motion information of a model to the terminal device 1020. The terminal device 1020 generates a moving image of a model based on the motion information distributed thereto and the model information stored in advance, thus displaying the moving image on the display D.

FIGS. 13A through 13D are drawings showing an example of a model M generated by the information distribution device 1010 of the present embodiment. The model M includes an element E and a joint J. In this example, the element E represents a trunk, a head, an arm, a leg, or the like. In this example, the joint J represents a joint portion connected between a trunk and a head, a joint portion connected between a trunk and an arm, a joint portion connected between a trunk and a leg, or the like.

Generally speaking, due to modeling of a single player, it is possible to finely render the movement of a player with a large number of elements E and a large number of joints J. In addition, the model M has a large information volume due to a large number of elements E and a large number of joints J.

Figure 13A:
FIG. 13A is a drawing showing an example of a model generated by an information distribution device according to the fourth embodiment.
Figure 13B:
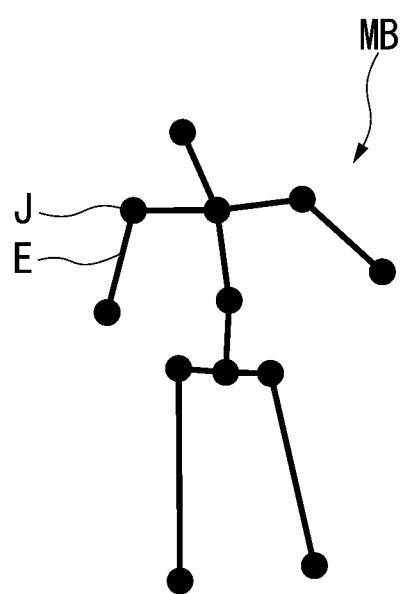
FIG. 13B is a drawing showing another example of a model generated by the information distribution device according to the fourth embodiment.
Figure 13C:
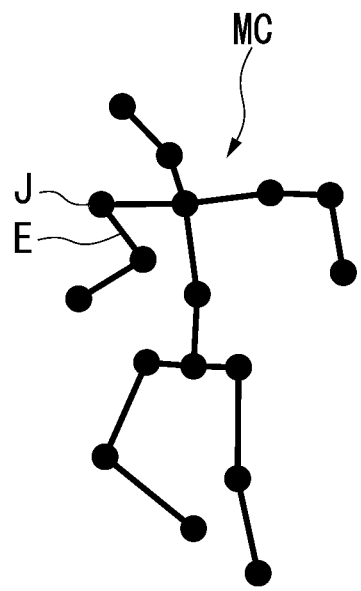
FIG. 13C is a drawing showing a further example of a model generated by the information distribution device according to the fourth embodiment.
Figure 13D:
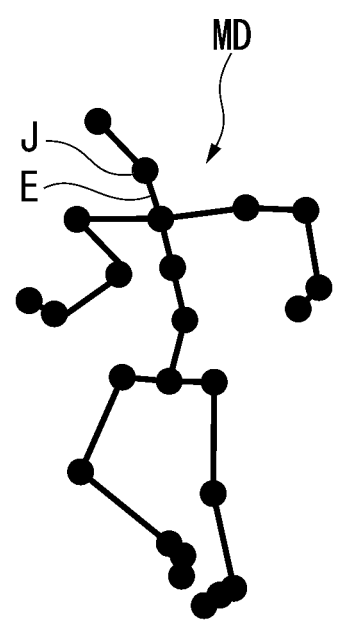
FIG. 13D is a drawing showing a further example of a model generated by the information distribution device according to the fourth embodiment.

For example, FIG. 13A show a model MA having a single element E (or a single joint J) having the smallest information volume. FIGS. 13B, 13C, and 13D show models MB, MC, and MD, which are increased in the number of elements E and the number of joints J. The model MD has the largest information volume among various models M illustrated here. Hereinafter, the model M will be referred to as "a point model". In addition, the models MB through MD will be referred to as multiple-joint models.

The information distribution device 1010 adjusts the information volume of the model M and the information volume of the motion information of the model M base on various factors described above. Hereinafter, an example of a concrete functional configuration of the information distribution system 1001 will be described with reference to FIG. 14.

<Functional Configuration of Information Distribution System 1001>

Figure 14:
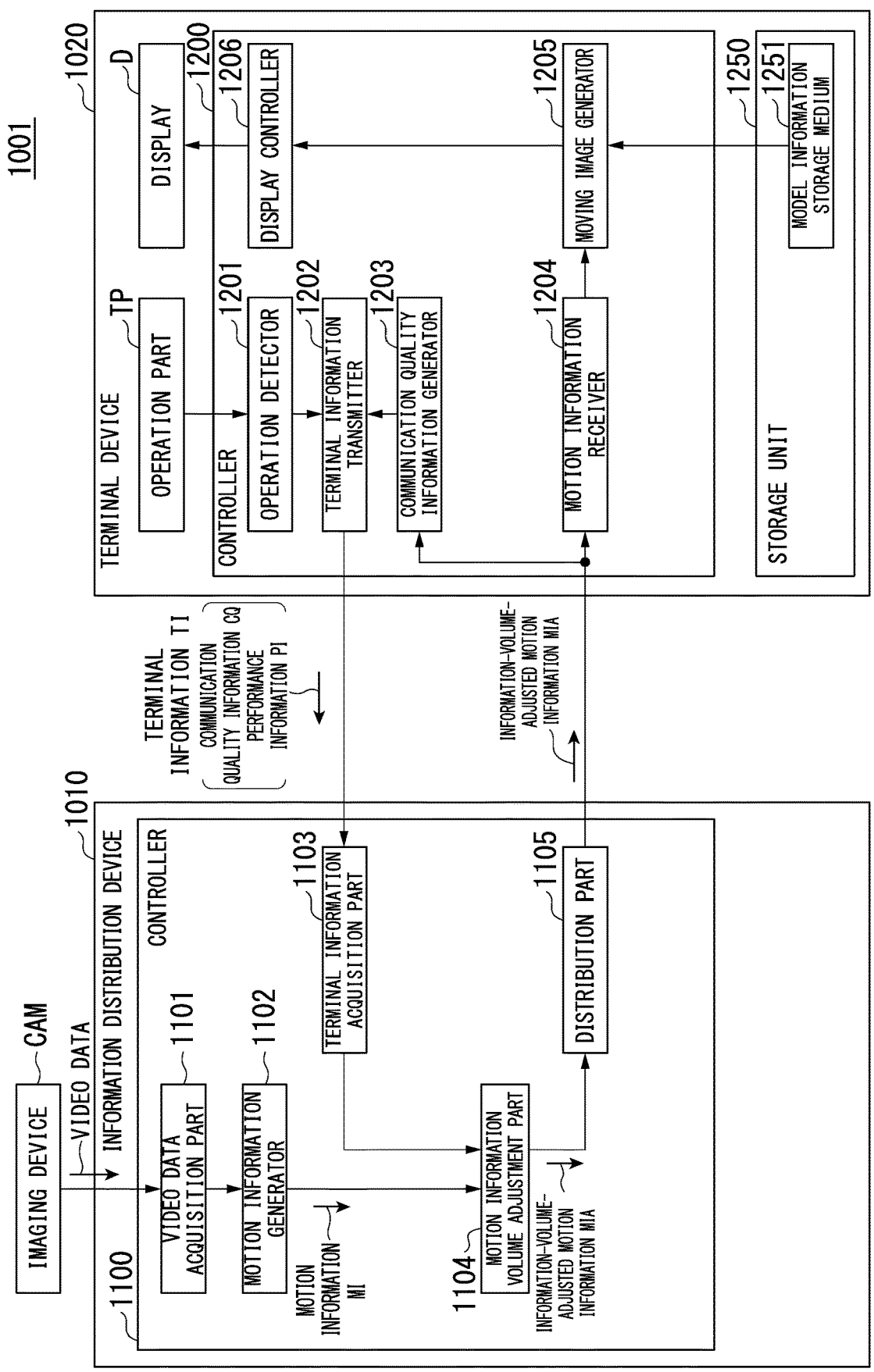
FIG. 14 is a block diagram showing an information distribution system according to the fourth embodiment.

FIG. 14 is a block diagram showing an example of a functional configuration of an information distribution system 1001 of the present embodiment. Hereinafter, the functional configuration of a terminal device 1020 will be described at first, and then the functional configuration of an information distribution device 1010 will be described.

<Functional Configuration of Terminal Device 1020>

The terminal device 1020 includes a controller 1200 and a storage unit 1250 in addition to the operation part TP and the display D. For example, the controller 1200 includes a CPU configured to carry out various calculations as well as transmission and reception of information. The controller 1200 includes functional parts such as an operation detector 1201, a terminal information transmitter 1202, a communication quality information generator 1203, a motion information receiver 1204, a moving-image generator 1205, and a display controller 1206.

The operation detector 1201 is configured to detect a user operation applied to the operation part TP. In this example, the operation detector detects "an operation to request distribution of motion information" by the user.

The communication quality information generator 1203 generates communication quality information CQ. The communication quality information CQ represents a quality of communication between the information distribution device 1010 and the terminal device 1020. Due to a weak radiowave condition between the information distribution device 1010 and the terminal device 1020, for example, the communication quality information generator 1203 generates the communication quality information CQ representing a low communication quality.

Specifically, the communication quality information generator 1203 determines a communication quality in consideration of communication speed with the information distribution device 1010 as well as a radio intensity and the number of times to retransmit information as necessary. The communication quality information generator 1203 generates the communication quality information CQ based on the determination result of the communication quality.

The terminal information transmitter 1202 transmits terminal information TI to the information distribution device 1010. The terminal information TI includes the communication quality information CQ and performance information PI. The performance information PI represents an image-processing performance of the terminal device 1020. The image-processing performance PI depends on the type of an arithmetic unit installed in the terminal device 1020 and its operating frequency, access speed and capacity of memory, the type of an image-processing engine and its operating frequency, and the like.

In this example, due to a user operation to request distribution, the terminal information transmitter 1202 transmits to the information distribution device 1010 the terminal information TI together with a request to distribute the motion information.

To transmit a request to distribute the motion information, the terminal information transmitter 1202 may request the motion information relating to a specific player or a player belonging to a specific team. In this case, the terminal information transmitter 1202 may request the motion information in response to a user operation. When the user operation designates a specific team, the terminal information transmitter 1202 may solely request the motion information relating to a player belonging to the team designated by the user.

In addition, the user may select a granularity of images (i.e. a granularity of the motion information to be distributed) displayed on the screen. In this case, the terminal information transmitter 1202 selects an information volume of the requested motion information in response to a user operation to select the granularity. When the user selects a rough-granularity image such as the image P2 to be displayed on the screen, for example, the terminal information transmitter 1202 requests the motion information having a relatively small information volume. When the user selects a fine-granularity image such as the image P3 to be distributed thereto, the terminal information transmitter 1202 requests the motion information having a relatively large information volume.

In this connection, the terminal information transmitter 1202 may select an information volume of the requested motion information based on the communication quality information CQ and the performance information PI irrespective of a user instruction. In this case, when the communication quality information CQ indicates a relatively high communication quality, for example, the terminal information transmitter 1202 requests the motion information having a relatively large information volume. When the communication quality information CQ indicates a relatively low communication quality, the terminal information transmitter 1202 requests the motion information having a relatively small information volume.

The storage unit 1250 includes a model information storage medium 1251. The model information storage medium 1251 is configured to store various pieces of information relating to the element E and the joint J of the model M.

The motion information receiver 1204 receives the motion information distributed by the information distribution device 1010.

The moving-image generator 1205 generates a moving image of the model M based on the motion information received by the motion information receiver 1204 and the model information stored on the model information storage medium 1251.

The display controller 1206 is configured to control the display D, thus displaying the moving image generated by the moving-image generator 1205.

Herein, the "motion information" received by the motion information receiver 1204 indicates the motion information whose information volume is adjusted by the information distribution device 1010. That is, the motion information receiver 1204 receives the information-volume-adjusted motion information MIA from the information distribution device 1010. The functional configuration of the information distribution device 1010 will be described below.

<Functional Configuration of Information Distribution Device 1010>

The information distribution device 1010 includes a controller 1100. For example, the controller 1100 includes a CPU configured to carry out various calculations as well as transmission and reception of information. The controller 1100 further includes functional parts such as a video data acquisition part 1101, a motion information generator 1102, a terminal information acquisition part 1103, a motion information volume adjustment part 1104, and a distribution part 1105.

The video data acquisition part 2101 acquires the video data VD from the imaging device CAM. For example, the video data VD may include an image of a player currently at a game.

Based on the video data VD acquired by the video data acquisition part 1101, the motion information generator 1102 carries out the image processing of a target image TGT included in the video data VD. In this example, the target image TGT may be an image of a player.

Specifically, the motion information generator 1102 carries out the image processing of the video data VD to separate an image of a player from a background image, thus extracting the target image TGT, i.e. an image of a player, from the video data VD. The motion information generator 1102 carries out a modeling operation of the extracted target image.

When the video data VD includes images of multiple players, the motion information generator 1102 extracts an image for each individual player to carry out a modeling operation for each player. By analyzing the motion of the model M, the motion information generator 1102 generates the motion information MI of the model M. For example, the motion information MI represents a motion vector of the model M. It is possible to obtain the motion vector by analyzing the motion of each player among multiple frames included in the video data VD by way of the known technique.

The terminal information acquisition part 1103 acquires the terminal information TI, i.e. the information to adjust the information volume of the motion information MI, from the terminal device 1020.

The motion information volume adjustment part 1104 adjusts the information volume of the motion information MI generated by the motion information generator 1102. As described above, the granularity of imaged displayable on the terminal device 1020 may have constraints due to the image-processing performance of the terminal device 1020 and the communication quality between the information distribution device 1010 and the terminal device 1020. The motion information volume adjustment part 1104 adjusts the information volume of the motion information MI by obtaining those constraints from the terminal device 1020.

The motion information volume adjustment part 1104 is configured to adjust information volumes according to two examples of schemes as follows.

(1) The situation of the motion information generator 1102 configured to generate a plurality of motion information MI having various information volumes in parallel.

The motion information generator 1102 is configured to generate a plurality of motion information MI with respect to the models M having various information volumes as shown in FIGS. 13A through 13D in parallel.

In this case, the motion information volume adjustment part 1104 selects the motion information MI having the information volume satisfying the constraint acquired from the terminal device 1020 among a plurality of motion information MI generated by the motion information generator 1102.

(2) The situation of the motion information generator 1102 configured to generate the motion information MI having a large information volume.

The motion information generator 1102 generates the motion information MI with respect to the model M having a relatively large number of elements E and a relatively large number of joints J among the models M having various information volumes shown in FIGS. 13A through 13D. For example, the motion information generator 1102 generates the motion information MI with respect to the model MD.

In this case, the motion information volume adjustment part 1104 generates the motion information MI having an information volume satisfying the constraint acquired from the terminal device 1020 by reducing some information from the motion information MI generated by the motion information generator 1102.

In any one of situations, the motion information volume adjustment part 1104 may adjust the information volume of the motion information MI generated by the motion information generator 1102 by adjusting the number of elements E included in the model M.

In addition, the motion information volume adjustment part 1104 may adjust the information volume of the motion information MI based on a reproduction delay time of the terminal device 1020. In this case, the terminal device 1020 periodically transmit to the information distribution device 1010 the reproduction time of the moving image which is generated based on the motion information MI. The motion information adjustment part 1104 calculates a degree of separation between the distribution time of the motion information MI and the reproduction time of the moving image which is generated based on the motion information MI. The motion information volume adjustment part 1104 adjusts the information volume of the motion information MI according to the calculated degree of separation. When a degree of separation between the distribution time of the motion information MI and the reproduction time of the moving image is larger than a predetermined threshold, for example, the motion information volume adjustment part 1104 reduces the information volume of the motion information MI by thinning out the motion information MI. When a degree of separation between the distribution time of the motion information MI and the reproduction time of the moving image is further larger than a predetermined threshold, the motion information volume adjustment part 1104 may further thin out the motion information MI. In this case, the motion information volume adjustment part 1104 reduces the information volume of the motion information MI by changing a degree of thinning out the motion information MI in a continuous manner or a stepwise manner according to a degree of separation between the distribution time of the motion information MI and the reproduction time of the moving image.

The motion information volume adjustment part 1104 outputs to the distribution part 1105 the motion information MI whose information volume has been adjusted, i.e. the information-volume-adjusted motion information MIA.

The distribution part 1105 distributes the information-volume-adjusted motion information MIA to the terminal device 1020.

<Operation of Information Distribution System 1001>

Next, the operation of the information distribution system 1001 will be described with reference to FIG. 15.

Figure 15:
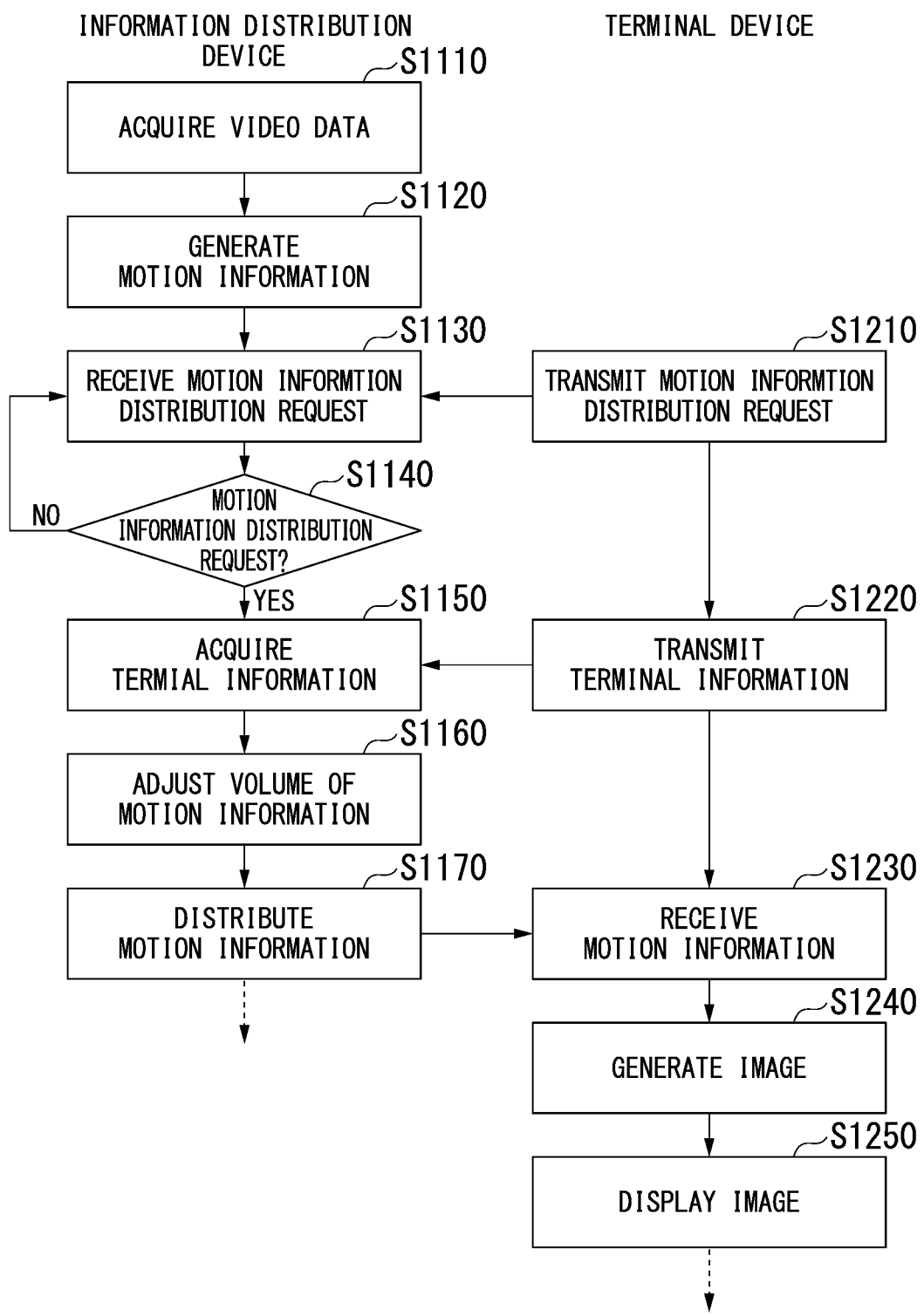
FIG. 15 is a flowchart showing an example of an operation of the information distribution system of the present embodiment.

FIG. 15 is a flowchart showing an example of the operation of the information distribution system 1001 according to the present embodiment.

(Step S1110) The video data acquisition part 1101 acquires the video data VD from the imaging device CAM. In this example, the imaging device CAM captures an image of the stadium SD at a viewpoint overlooking the entirety of the stadium SD holding a soccer game. In this case, the video data VD may include images of all the players participating the game.

(Step S1120) The motion information generator 1102 generates the motion information MI relating to the model M of a player based on the video data VD acquired by the video data acquisition part 1101.

In this example, the motion information generator 1102 generates the motion information MI irrespective of the existence/absence of a distribution request of the motion information from the terminal device 1020. In this connection, the motion information generator 1102 generates the motion information MI for each of the models M shown in FIGS. 13A through 13D.

(Step S1210) The terminal device 1020 transmits the distribution request of the motion information to the information distribution device 10.

(Steps S1130 through S1140) The information distribution device 1010 waits for the distribution request to be transmitted thereto from the terminal device 1020. Upon receiving the distribution request from the terminal device 1020 (step S1140; YES), the information distribution device 1010 carries out a series of steps S1150 through S1170.

(Step S1220) the terminal information transmitter 1202 of the terminal device 1020 transmits the terminal information TI to the information distribution device 1010.

(Step S1150) The terminal information acquisition part 1103 of the information distribution device 1010 receives the terminal information TI from the terminal device 1020.

In this example, the above descriptions refer to the terminal device 1020 configured to sequentially transmit the distribution request of the motion information and the terminal information TI; but this is not a restriction. The terminal device 1020 may concurrently transmit the distribution request of the motion information and the terminal information TI.

(Step S1160) The motion information volume adjustment part 1104 adjusts the information volume of the motion information MI, which is generated in step S1120 based on the terminal information TI acquired in step S1150. Specifically, when the terminal information TI requests the information distribution device 1010 to distribute the "point model" rather than the "multiple-joint model", the motion information volume adjustment part 1104 selects the motion information MI subjected to transmission as the point-model motion information MI, which corresponds to the model MA shown in FIG. 13A, among a plurality of motion information MI representing a plurality of models generated by the motion information generator 1102. The motion information volume adjustment part 1104 outputs to the distribution part 1105 the selected motion information MI as the information-volume-adjusted motion information MIA.

In this connection, the terminal information TI may include the information for designating the type (or granularity) of a model subjected to distribution. Alternatively, the motion information volume adjustment part 1104 may be configured to determine the type (or granularity) of a model subjected to distribution based on the terminal information TI. According to the former configuration of "the terminal information TI configured to include the type (or granularity) of a model subjected to distribution", the motion information volume adjustment part 1104 selects the type of a model designated by the terminal information TI. According to the latter configuration of "the motion information volume adjustment part 1104 configured to determine the type (or granularity) of a model subjected to distribution based on the terminal information TI", the motion information volume adjustment part 1104 selects the type of a model subjected to transmission by way of comparison between the information volume of the motion information MI for each model M generated by the motion information generator 1102 and the distributable information volume indicated by the terminal information TI.

(Step S1170) The distribution part 1105 distributes the information-volume-adjusted motion information MIA to the terminal device 1020.

(Steps S1230 through S1250) The motion information receiver 1204 of the terminal device 1020 receives the information-volume-adjusted motion information MIA distributed thereto. The moving image generator 1205 generates the moving image of the model M based on the received information-volume-adjusted motion information MIA. The display controller 1206 displays the moving image on the display D.

After receiving the distribution request of the motion information and the terminal information TI from the terminal device 1020 in a series of steps S1130 through S1150, the information distribution device 1010 distributes the information-volume-adjusted motion information MIA to the terminal device 1020 every time it generates the motion information MI. In short, the information distribution device 1010 distributes the information-volume-adjusted motion information MIA in real time. Herein, the real-time distribution is to generate the motion information MI every time the information distribution device 1010 receives the video data VD and to thereby distribute the information-volume-adjusted motion information MIA which is produced by adjusting the information volume of the motion information MI.

Figure 16A:
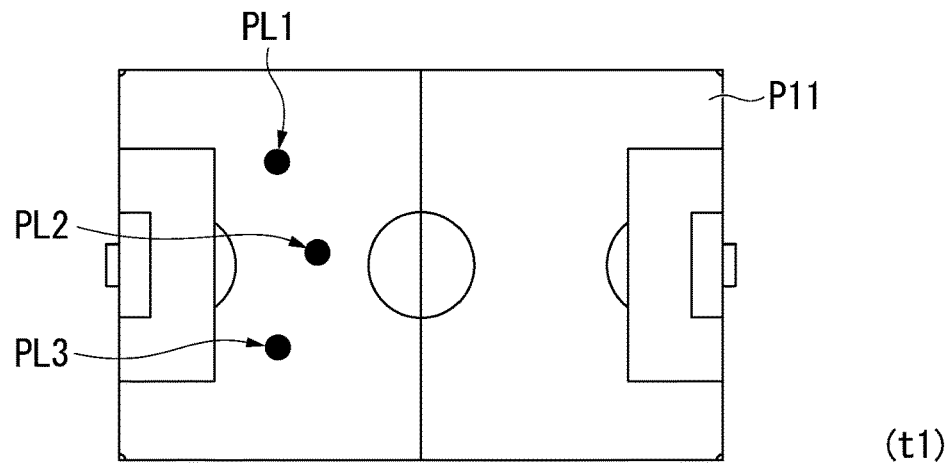
FIG. 16A is an image diagram showing an example of a moving image displayed on a terminal deice of the fourth embodiment.
Figure 16B:
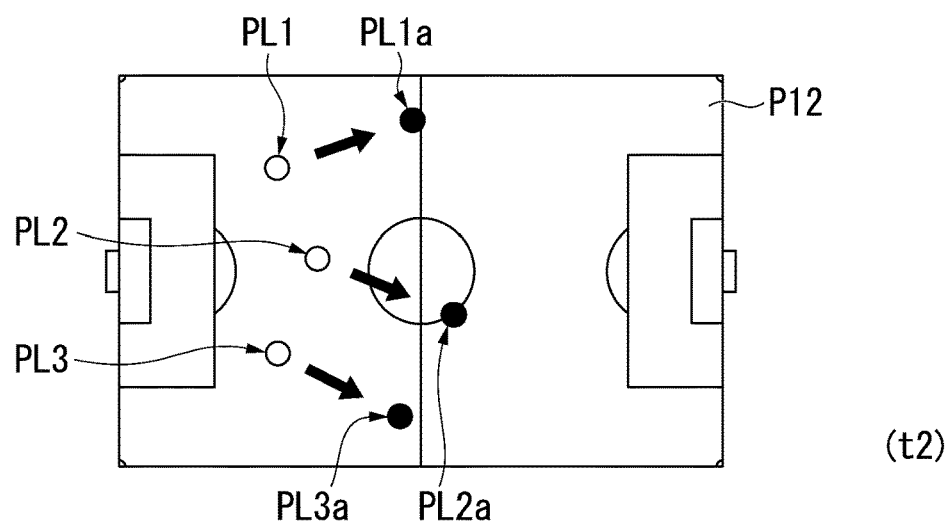
FIG. 16B is an image diagram showing another example of a moving image displayed on the terminal device of the fourth embodiment.
Figure 16C:
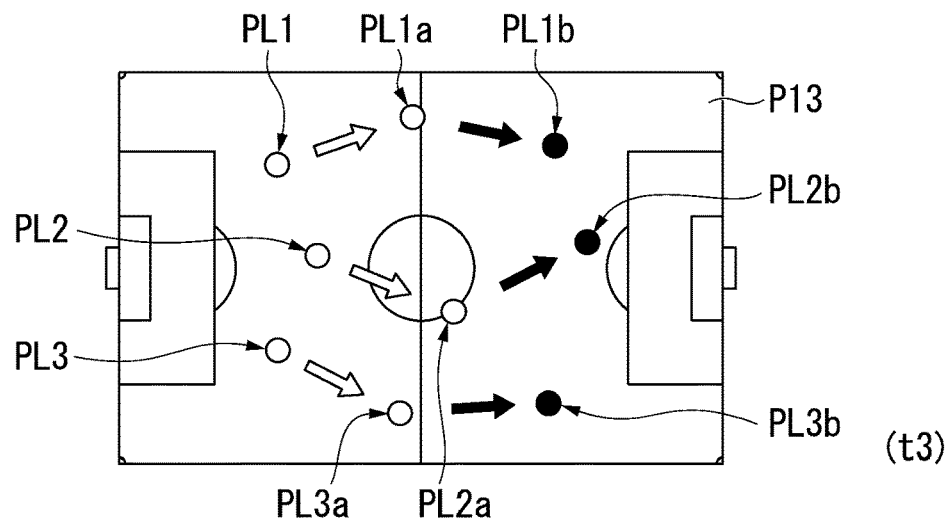
FIG. 16C is an image diagram showing a further example of a moving image displayed on the terminal display of the fourth embodiment.

FIGS. 16A, 16B, and 16C show an example of moving images displayed on the terminal device 1020 of the present embodiment. The information distribution device 1010 generates the motion information MI every time it receives the video data VD. The information distribution device 1010 adjusts the information volume of the motion information MI based on the terminal information TI acquired from the terminal device 1020 and then distributes the information-volume-adjusted motion information MIA in real time.

Those drawings show an example of the terminal device 1020 configured to request the information-volume-adjusted motion information MIA with respect to the "point model".

At time t1, the information distribution device 1010 distributes to the terminal device 1020 the information representing the current positions of players PL1, PL2, and PL3 as the information-volume-adjusted motion information MIA. The terminal device 1020 displays an image P11 representing the current positions of the players PL1, PL2, and PL3 on the display D based on the information-volume-adjusted motion information MIA distributed thereto (FIG. 16A).

At time t2, the information distribution device 1010 distributes to the terminal device 1020 the information representing the motions of the players PL1, PL2, and PL3 as the information-volume-adjusted motion information MIA. The terminal device 1020 displays an image P12 representing the moving traces and the current positions of the players PL1, PL2, and PL3 on the display D based on the information-volume-adjusted motion information MIA distributed thereto (FIG. 16B).

At time t3 similar to time t2, the terminal device 1020 displays an image P13 representing the moving traces and the current positions of the players PL1, PL2, and PL3 on the display D (FIG. 16C).

In this connection, the information representing the motions of the players PL1, PL2, and PL3 may be the information representing the displacement directions and the displacement values of players in a period of time counted from time t1 to time t2, or the information representing the positions of players at time t2.

As described above, the information distribution system 1001 of the present embodiment does not necessarily distribute the moving images such as the video data VD directly to the terminal device 1020 but distributes the motion information of the model M corresponding to a player included in the video data VD. Herein, the information volume of the motion information of the model M is smaller than the information volume of the moving image such as the video data VD. Compared to the configuration to directly distribute the moving image such as the video data VD, the information distribution system 1001 is configured to distribute a reduced amount of information.

According to the information distribution system 1001 of the present embodiment, it is possible to distribute content in real time.

The following descriptions refer to the user of the terminal device 1020 as a spectator in a stadium, wherein the information distribution device 1010 is configured to distribute the information of a game held in the stadium. In this case, the user of the terminal device 1020 may watch the game deployed before user's eyes with a smartphone or a tablet terminal at hand in real time. The information distribution system 1001 is configured to display the position and the moving trace of each player on the terminal device 1020 in real time and to thereby provide the user with the enjoyable information causing the user to enjoy watching the game. In the information distribution system 1001, the terminal device 1020 is configured to generate any content suited to user's preference based on the motion information of the model M. For example, the terminal device 1020 may display an enlarged image of a specific player based on the motion information of the model M distributed thereto or provide audio commentary based on the motion information. According to the information distribution system 1001, it is possible to provide any content suited to user's preference.

To distribute information in a stadium or the like, the number of terminal devices 1020 may be increased in proportion to the number of spectators, whereas the conventional technology configured to directly distribute the video data VD may suffer from a problem due to a difficulty of providing content with an adequate quality since communication capacities of wireless communication lines used for distributing information will be tightened. The information distribution system 1001 of the present embodiment may reduce a degree of tightness in communication capacities of wireless communication lines due to a smaller amount of communication to distribute information compared to the amount of communication to directly distribute the video data VD.

The information distribution device 1010 of the present embodiment adjusts the information volume of the motion information MI based on the terminal information TI, which is transmitted from the terminal device 1020 subjected to distribution of information, and then distributes the information-volume-adjusted motion information MIA. Accordingly, the information distribution device 1010 is able to reduce the information volume of the motion information MI according to the performance of the terminal device 1020 and the status of communication between the information distribution device 1010 and the terminal device 1020. Compared with the configuration to distribute the motion information MI without adjusting its information volume, the information distribution device 1010 is able to further reduce the amount of communication to distribute information.

In this connection, the terminal device 1020 may update the communication quality information CQ according to any change occurring in the communication status with the information distribution device 1010 so as to repeatedly transmit the terminal information TI to the information distribution device 1010. In this case, the information distribution device 1010 may select the motion information MI having an information volume depending on the communication quality ever time it receives the terminal information TI. That is, the information distribution device 1010 may change the information volume of the information-volume-adjusted motion information MIA in real time.

The aforementioned descriptions refer to the terminal device 1020 configured to store the information such as the element E and the joint J of the model M in advance; but this is not a restriction. Upon receiving a distribution request of the motion information MI, the information distribution device 1010 may distribute the information of the model M to the terminal device 1020.

Fifth Embodiment

Hereinafter, an information distribution system 1001a of the fifth embodiment will be described with reference to FIG. 17.

Figure 17:
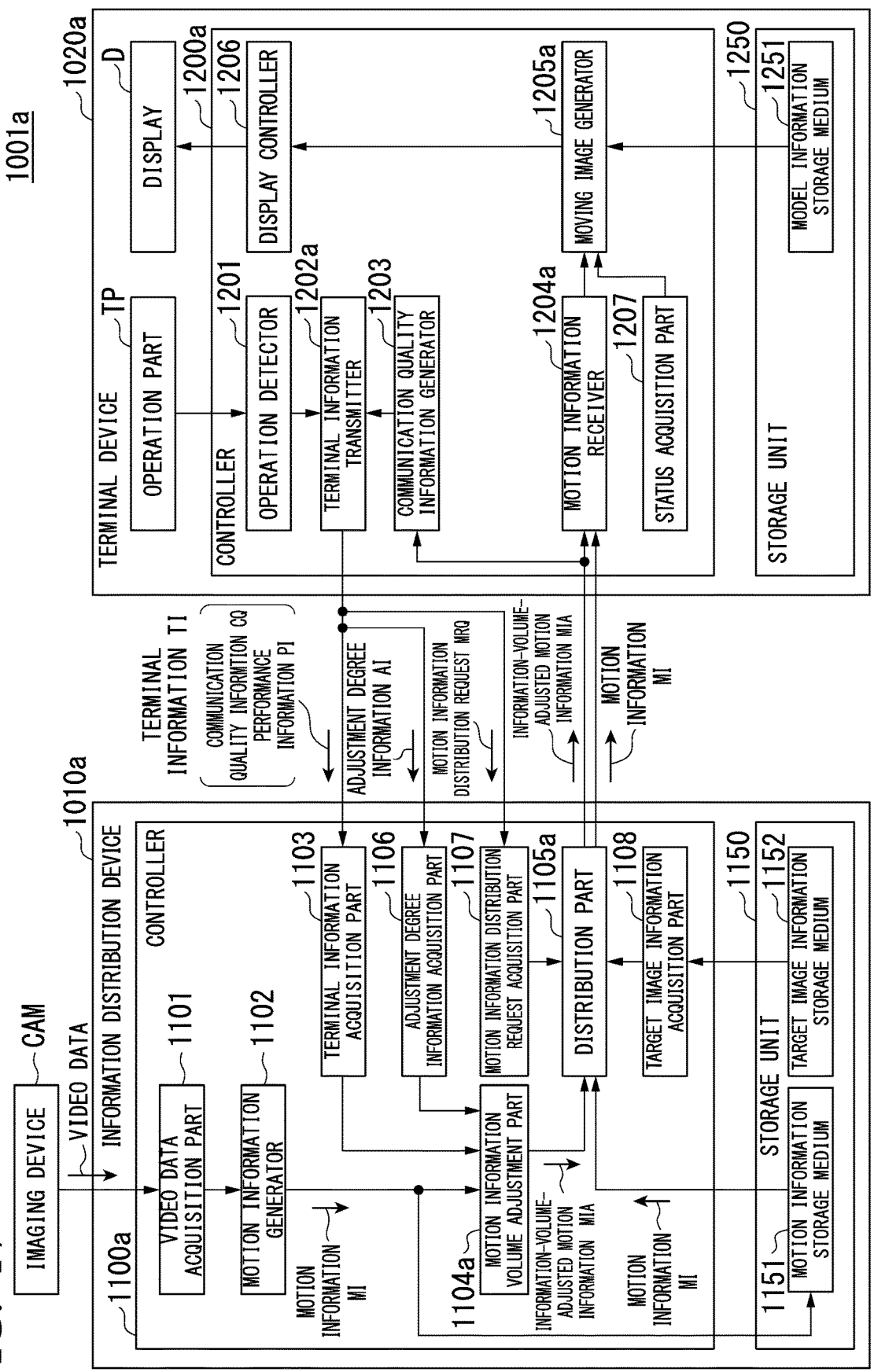
FIG. 17 is a block diagram showing an information distribution system according to the fifth embodiment.

FIG. 17 is a block diagram showing an example of a functional configuration of the information distribution system 1001a according to the fifth embodiment. The information distribution system 1001a differs from the fourth embodiment in terms of (1) the display function according to the status of a terminal device 1020a, (2) the function to change a volume of distributing information according to a user operation, (3) the non-real-time distribution function, (4) the function to distribute multiple-angle motion information MI or free-viewpoint motion information MI, (5) the function to display moving images depending on a watching position, (6) the function to display additional information such as player information. Those functions will be described below. Herein, the same configurations and operations similar to those of the fourth embodiment will be denoted using the same reference signs; hence, the descriptions thereof will be omitted here.

<(1) Display Function According to Status of Terminal Device 1020>

The terminal device 1020a includes a controller 1200a further including functional parts such as a moving image generator 1205a and a status acquisition part 1207. The status acquisition part 1207 acquires the status of the terminal device 1020a. Herein, the status of the terminal device 1020a may include the processing load of the terminal device 1020a, the battery charge of the terminal device 1020a, and the ambient brightness of the terminal device 1020a.

<Change of Display According to Processing Load of Terminal Device 1020a>

The status acquisition part 1207 acquires the status of the processing load of the terminal device 1020a. For example, a processing delay may occur in moving images generated in real time due to an increase of the processing load when the controller 1200a concurrently executes a plurality of processes. In this case, the status acquisition part 1207 notifies a moving image generator 1205a of an increase of the processing load of the controller 1200a.

The moving image generator 1205a generates a moving image of the model M according to the status based on the motion information MI and the status acquired by the status acquisition part 1207. Herein, the moving image generator 1205a may change parameters such as resolutions which can be changed by the terminal device 1020a. In the above example, when the processing load of the controller 1200a is increased, for example, the moving image generator 1205a may reduce resolutions of moving images so as to maintain generating moving images in real time.

<Change of Display According to Battery Charge of Terminal Device 1020a>

The status acquisition part 1020a acquires the status of the battery charge of the terminal device 1020a. When the battery charge of the terminal device 1020a is lower than a certain threshold, for example, the status acquisition part 1207 notifies the moving image generator 1205a of a low battery charge.

Due to the low battery charge, the moving image generator 1205a reduces the granularity of images to reduce power consumption, thus increasing the time to generate moving images.

<Change of Display According to Ambient Brightness of Terminal Device 1020a>

The status acquisition part 1207 acquires ambient illumination (or brightness) of the terminal device 1020a. The moving image generator 1205a generates moving images according to the brightness acquired by the status acquisition part 1207. The ambient illumination of the terminal device 1020a may be varied in environments as to whether a soccer game is held in the daytime or the nighttime. In this case, the moving image generator 1205a may change properties of moving images such as color schemes, font sizes, resolutions or the like differently in the daytime and the nighttime.

<(2) Function to Change Volume of Distributing Information According to User Operation>

The information distribution system 1001a is configured to change the volume of distributing information according to a user operation. For example, the user of the terminal device 1020a may request to distribute the information relating to the "point model" rather than the "multiple-point model". In this case, the operation detector 1201 detects a user operation to request distribution of the "point model". According to the user operation, a terminal information transmitter 1202a transmits adjustment degree information AI, representing a degree of adjusting the information volume, to the information distribution device 1010a. In this example, the terminal information transmitter 1202a transmits the adjustment degree information AI indicating the "point model" to the information distribution device 1010a.

A controller 1100a includes functional parts such as a motion information volume adjustment part 1104a, a distribution part 1105a, and an adjustment degree information acquisition part 1106.

The adjustment degree information acquisition part 1106 acquires the adjustment degree information AI transmitted by the terminal device 1020a. The motion information volume adjustment part 1104a adjusts the information volume of the motion information MI based on the adjustment degree AI acquired by the adjustment degree information acquisition part 1106. In this example, the motion information volume adjustment part 1104a selects the motion information MI of the "point model" as the motion information MI to be distributed to the terminal device 1020a. The motion information volume adjustment part 1104a outputs to the distribution part 1105a the information-volume-adjusted motion information MIA as the motion information MI of the "point model".

<(3) Non-Real-Time Distribution Function>

Heretofore, an example of real-time distribution with the information distribution device 1010 and the information distribution device 1010*a* has been described; but this is not a restriction. The information distribution device 1010*a* may carry out non-real-time distribution.

According to the non-real-time distribution, the motion information MI is not immediately distributed to the terminal device 1020*a* after generating the motion information MI, but the motion information MI is temporarily stored and then distributed to the terminal device 1020*a* upon its request.

Specifically, the information distribution device 1010*a* includes a storage unit 1150. The storage unit 1150 further includes a motion information storage medium 1151. The motion information storage medium 1151 sequentially stores a plurality of motion information MI generated by the motion information generator 1102 in an order of generating them. That is, the motion information storage medium 1151 stores the motion information MI having a large information volume before adjustment of the information volume by the motion information volume adjustment part 1104*a*.

The controller 1100*a* includes a motion information distribution request acquisition part 1107. Upon receiving a motion information distribution request MRQ from the terminal device 1020*a*, the motion information distribution request acquisition part 1107 notifies the distribution part 1105*a* of the motion information distribution request MRQ.

Upon receiving a notice of receiving the motion information distribution request MRQ, the distribution part 1105*a* reads the motion information MI stored on the motion information storage medium 1151 and then distributes the motion information MI to the terminal device 1020*a*.

The information distribution system 1001*a* carries out non-real-time distribution over relatively-vacant wireless communication lines used for distribution of information, and therefore it is possible to distribute the motion information MI having a lager information volume than the real-time distribution.

The information distribution device 1010*a* may selectively carry out non-real-time distribution with the terminal device 1020*a* already subjected to real-time distribution. In this case, upon receiving a request of non-real-time distribution from the terminal device 1020*a* which has not carried out real-time distribution, the information distribution device 1010*a* declines the request of non-real-time distribution. An example of a non-real-time distribution operation of the information distribution device 1010*a* will be described with reference to FIG. 18.

Figure 18:
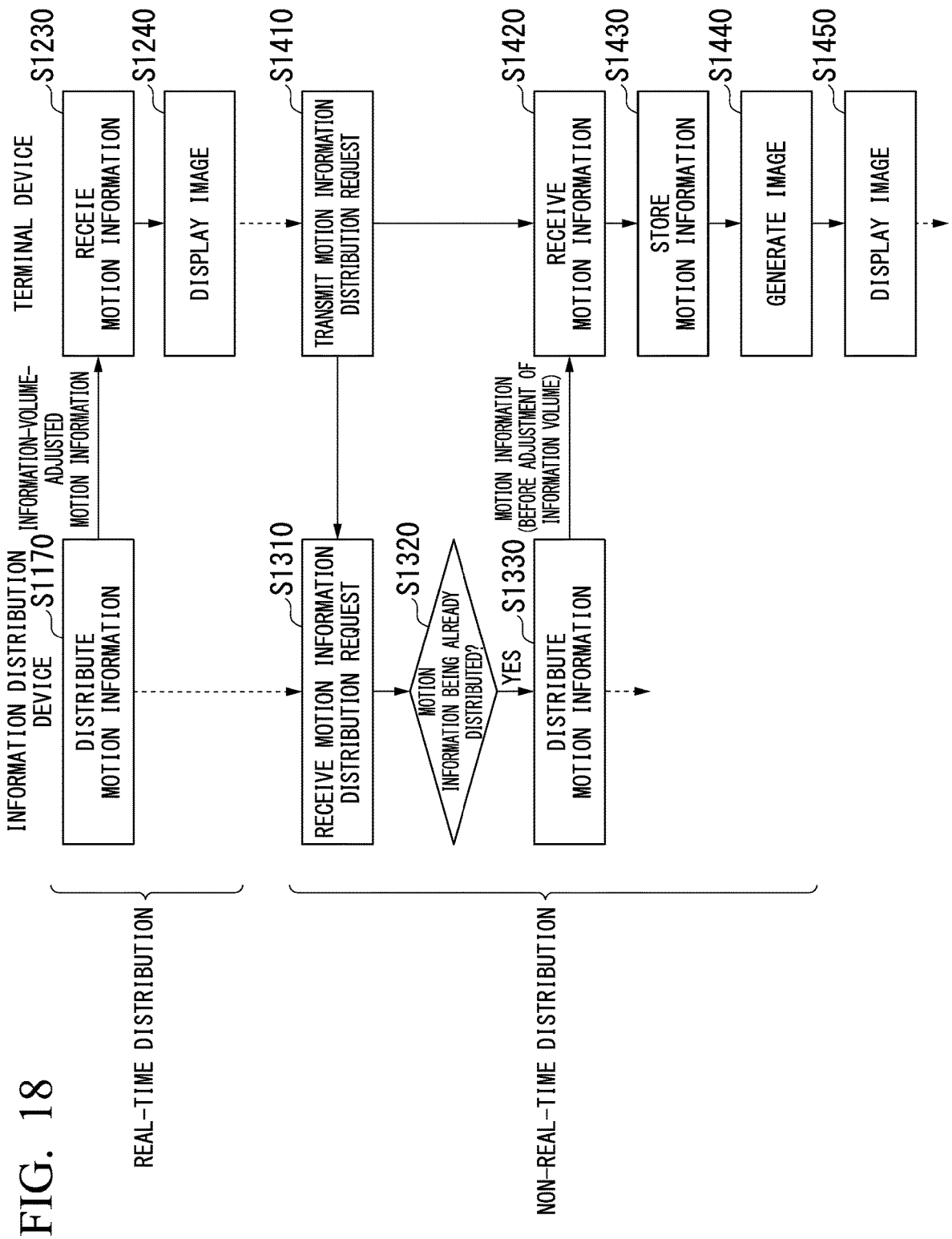
FIG. 18 is a flowchart showing an example of a non-real-time distribution operation of an information distribution device according to the fifth embodiment.

FIG. 18 is a flowchart showing an example of non-real-time distribution operation of the information distribution device 1010*a* of the present embodiment.

(Step S1170, S1230 through S1240) The information distribution system 1001*a* carries out the aforementioned real-time distribution. The information distribution device 1010*a* registers the terminal device 1020 subjected to real-time distribution.

(Steps S1410, S1310) The terminal information transmitter 1202*a* of the terminal device 1020*a* a motion information distribution request according to non-real-time distribution. Specifically, the terminal information transmitter 1202*a* transmits a motion information distribution request MRQ to the information distribution device 1010*a*. The motion information distribution request acquisition part 1107 of the information distribution device 1010*a* acquires the motion information distribution request MRQ transmitted by the terminal device 1020*a*.

(Step S1320) The distribution part 1105*a* determines whether or not the information-volume-adjusted motion information MIA has been distributed to the terminal device 1020*a* transmitting the motion information distribution request MRQ, i.e. whether or not real-time distribution has been carried out. Specifically, the distribution part 1105*a* determines whether or not the terminal device 1020*a* transmitting the motion information distribution request MRQ matches the terminal device 1020*a* which is registered as the terminal device 1020*a* subjected to real-time distribution.

(Step S1330) The distribution part 1105*a* distributes to the terminal device 1020*a* the motion information MI stored on the motion information storage medium 1151.

(Steps S1420 through S1450) Upon receiving the motion information MI (S1420), the terminal device 1020*a* stores the motion information MI on the storage unit 1250 (S1430). The terminal device 1020*a* sequentially reads a plurality of motion information MI to generate moving images (S1440). The display controller 1206 displays moving images on the display D (S1450).

According to the above configuration, the information distribution device 1010*a* may provide the user with the motivation to carry out real-time distribution.

The above descriptions refer to an example of the information distribution device 1010*a* configured to distribute the motion information MI; but this is not a restriction. In the non-real-time distribution, the information stored on the storage unit 1150 of the information distribution device 1010*a* is transferred to the storage unit 1250 of the terminal device 1020*a*, and then the information is read from the storage unit 1250 and displayed on the screen. Therefore, real-time property is not required for transmitting or receiving the information between the information distribution device 1010*a* and the terminal device 1020*a*. In the non-real-time distribution, it is possible to distribute the information having a large information volume up to the storage capacity of the storage unit 1150 and the storage capacity of the storage unit 1250. In the non-real-time distribution, for example, the information distribution device 1010*a* may distribute to the terminal device 1020*a* the video data VD instead of the motion information MI or in addition to the motion information MI.

<(4) Function to Distribute Multiple-Angle Motion Information MI or Free-Viewpoint Motion Information MI>

The above descriptions refer to a single imaging device CAM; but this is not a restriction. It is possible to provide a plurality of imaging devices CAM each configured to supply the video data VD to the information distribution system 1001*a*. In the case of three or more imaging devices CAM, for example, it is possible to generate the motion information MI based on the video data VD.

Figure 19:
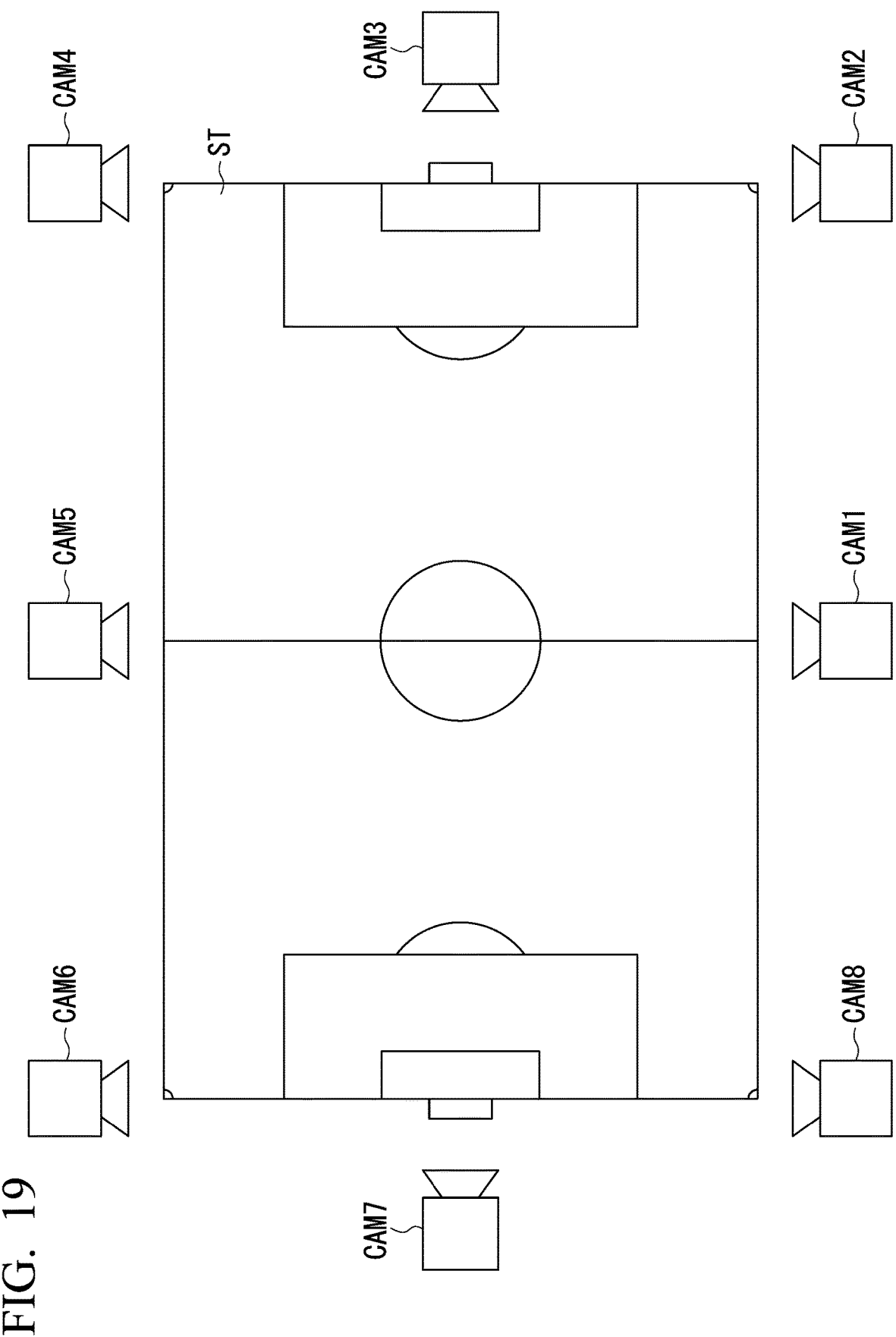
FIG. 19 is a layout diagram showing an example of a layout of imaging devices in a stadium facilitating a plurality of imaging devices.

FIG. 19 is a layout diagram showing an example of a layout of imaging devices CAM when a plurality of imaging devices CAM are located in the stadium SD. In this example, eight imaging devices CAM, i.e. imaging devices CAN1 through CAM8, are located in the stadium SD. In this case, the video data acquisition part 1101 of the information distribution device 1010*a* acquires a plurality of video data VD captured by the imaging devices CAM, i.e. video data VD1 through VD8. The motion information generator 1102 generates the motion information MI for each video data VD. According to this configuration, the information distribution device 1010*a* is configured to distribute the motion information MI in multiple angles.

When the terminal device 1020*a* requests the information distribution device 1010*a* to distribute the motion information MI at the viewpoint position of the imaging device CAM2, for example, the information distribution device 1010*a* distributes the motion information MI at the viewpoint position of the imaging device CAM2.

In addition, the information distribution device 1010*a* is able to generate the free-viewpoint motion information MI, i.e. the motion information MI at an arbitrary viewpoint position, based on a plurality of video data VD captured at a plurality of viewpoint positions. In this case, the information distribution device 1010*a* generates and distributes the motion information MI at the viewpoint position indicated by the terminal device 1020*a*.

The above descriptions refer to the information distribution device 1010*a* configured to convert coordinates of viewpoint positions; but this is not a restriction. The terminal device 1020*a* may switch over viewpoint positions. In this case, the information distribution device 1010*a* distributes to the terminal device 1020*a* the coordinates information representing the position of a player in the stadium SD together with the motion information MI. The moving image generator 1205 of the terminal device 1020*a* carries out coordinates conversion of the information distributed by the information distribution device 1010*a* based on the viewpoint information and the coordinates information indicated by the user, thus generating free-viewpoint moving images.

<(5) Function to Display Moving Image Depending on Watching Position>

The status acquisition part 1207 of the terminal device 1020*a* acquires the current position of the terminal device 1020*a* as its status. The motion information generator 1102 of the information distribution device 1010*a* carries out coordinate conversion of the motion information MI at the viewpoint position corresponding to the current position of the terminal device 1020*a* acquired by the status acquisition part 1207. According to this configuration, the information distribution system 1001*a* may display moving images depending on the current position of the terminal device 1020*a*, i.e. the user-watching position, on the terminal device 1020*a*. Accordingly, the information distribution system 1001*a* may display moving images depending on the user-watching position without a user instruction to designate the viewpoint position.

In this connection, as described above, the moving image generator 1205*a* of the terminal device 1020*a* may carry out coordinate conversion of viewpoint positions.

<(6) Function to Display Additional Information such as Player Information>

The information distribution system 1001*a* is able to distribute the information relating to the target image TGT in addition to the motion information MI. In this case, the information distribution device 1010*a* is designed such that the controller 1100*a* further includes a target image information acquisition part 1108 while the storage unit 1150 further includes a target image information storage medium 1152.

The target image information acquisition part 1108 acquires the information relating to the target image TGT. Specifically, the motion information generator 1102 extracts the target image TGT from the video data VD. For example, the target image TGT is an image of a player's whole body. The target image information acquisition part 1108 specifies a player, which is extracted as the target information TGT, based on various pieces of information included in the target image TGT such as the design of a uniform, a uniform number, and physical characteristics. The target image information acquisition part 1108 reads the information relating to the specified player from the target image information storage medium 1152 so as to supply it to the distribution part 1105*a*. The distribution part 1105*a* distributes the information relating to the target image TGT together with the motion information MI.

In the case of a soccer game, for example, the information relating to the target image TGT may include various pieces of information such as the name of a player, a facial photograph, a history of games, the position of a player, and the number of shooting goals. In the case of a horse race, the information relating to the target information TGT may include various pieces of information such as a horse owner, a trainer's comment, the condition of a horse in a paddock, odds, and the current order of a horse in a race.

That is, the information relating to the target image TGT may define attributes of the target image TGT.

In addition, the information relating to the target image TGT may include the identification information for identifying a player or a racehorse. In this case, when the user selects an image of a player or a racehorse, the information distribution system 1001*a* may acquire the relational information such as the history and the record of a player based on the identification information of the target image TGT corresponding to the selected player or racehorse. By distributing the relational information such as the history and the record of a player to the terminal device 1020*a*, the information distribution system 1001*a* may provide the user with the history and the record of the player selected by the user.

The information relating to the target image TGT may include other pieces of information such as a player's team and a player's position. In this case, the information distribution system 1001*a* may display colors differentiating teams and symbols identifying positions.

The target image TGT is not necessarily limited to an image of a player, and therefore the target image TGT may be an image capturing tools and facilities used in games. For example, the target image TGT may be an image capturing a ball and a goal in a soccer game, a referee, a card or a flag held by a referee, or the like. The target image TGT may be an image capturing a jockey of a racehorse, a racehorse, a saddle, a gate, a starter at a gate, a flag held by a starter, a goal, an order of finish board, or the like. The target image TGT may be an image capturing a driver in a motor race, a vehicle in a race, a clue in a pit, replacement tires, a flag aside a course, or the like.

When the target image TGT captures a ball in a soccer game, for example, the information distribution system 1001*a* may distribute the motion information MI representing the moving trace of a ball.

By storing the motion information MI, the terminal device 1020*a* may display moving images at timings after the timing of the motion information MI distributed thereto. In this case, the terminal device 1020*a* may read the motion information MI to display moving images according to a user's playback operation. In addition, the terminal device 1020*a* may display a slide bar representing the playback position and the time required to play back moving images on the display D, thus displaying moving images at an arbitrary playback position according to a user operation on the slide bar.

In addition, the information distribution system 1001*a* may grasp the current position of the terminal device 1020*a* so as to select the terminal device 1020*a* subjected to distribution located within a predetermined range of distance. For example, the information distribution system 1001*a* acquires the position information of the terminal device 1020*a* accessible to a base station in a mobile communication network or the position information of the terminal device 1020*a* which can be acquired via a GPS or a short-range wireless communication. Based on the position information of the terminal device 1020*a*, the information distribution system 1001*a* determines whether or not the terminal device 1020*a* can be regarded as an information-distributing target. To solely distribute information data to the user located in a stadium currently holding a soccer game, for example, the information distribution system 1001*a* determines the terminal device 1020*a* as an information-distributing target when the terminal device 1020*a* is currently located in the stadium.

When the terminal device 1020*a* stores the motion information MI distributed thereto, the information distribution system 1001*a* may control the terminal device 1020*a* to erase the motion information MI. In this case, when the terminal device 1020*a* moves out of a predetermined range of distribution, for example, the information distribution system 1001*a* erases the motion information MI stored on the terminal device 1020*a*.

To display moving images based on the motion information MI, the information distribution system 1001*a* may distribute the video data VD, i.e. an original image of the motion information MI, according to a user operation. For example, it is possible to assume a situation in which the terminal device 1020*a* stores the motion information MI distributed thereto since the user may reproduce the moving image based on the motion information MI. In this situation, the user may prefer reproduction of the video data VD serving as an original image rather than the moving image based on the motion information MI. In this case, the information distribution system 1001*a* distributes the video data VD serving as an original image of the motion information MI according to a user operation.

Heretofore, the present invention has been described with respect to the embodiments and variations, however, the embodiments and variations are illustrative and not intended to limit the scope of the invention. The embodiments and variations can be realized in various manners; hence, it is possible to omit, replace, and change various configurations without departing from the subject matter of the invention. The embodiments and variations should be included in the subject matter and the scope of the invention as well as the scope of the invention as defined in the claims and its equivalents.

The devices described above may include computer systems. The foregoing processes of the devices may be realized by programs and stored on computer-readable storage media, and therefore computers may read and execute programs to implement the foregoing processes. Herein, computer-readable storage media may refer to magnetic disks, magneto-optical disks, CD-ROM, DVD-ROM, semiconductor memory, and the like. In addition, it is possible to distribute computer programs to computers through communication lines, whereby computer receiving distributed programs may execute programs.

The above programs may achieve part of the foregoing functions. In addition, the above programs may be so-called differential files (or differential programs) which can be combined with programs pre-installed in computer systems to implement the foregoing functions.

Heretofore, the present invention has been described in conjunction with the foregoing embodiments with reference to the drawings, but concrete configurations are not necessarily limited to the foregoing embodiments; hence, it is possible to appropriately modify the embodiments without departing from the subject matter of the invention. In addition, it is possible to combine the foregoing configurations described in the embodiments.

Part or the entirety of the foregoing embodiments can be paraphrased by the following appendixes, which are not restrictive.

(Appendix 1)

An information distribution device comprising:

a video data acquisition part configured to acquire video data;

a motion information generator configured to generate motion information for each model representing a motion of a model which is produced via image processing of a target information included in the video data based on the video data acquired by the video data acquisition part;

a terminal information acquisition part configured to acquire terminal information either performance information of a terminal device, which the motion information is distributed to, or communication quality information representing a communication quality with the terminal device;

a motion information volume adjustment part configured to adjust an information volume of the motion information generated by the motion information generator based on the terminal information acquired by the terminal information acquisition part; and a distribution part configured to distribute information-volume-adjusted motion information, which is adjusted by the motion information volume adjustment part, to the terminal device.

(Appendix 2)

The information distribution device according to Appendix 1, further comprising an adjustment degree information acquisition part configured to acquire adjustment degree information representing a degree of adjusting the information volume requested by the terminal device from the terminal device, wherein the motion information volume adjustment part further adjusts the information volume of the motion information generated by the motion information generator based on the adjustment degree information acquired by the adjustment degree information acquisition part.

(Appendix 3)

The information distribution device according to Appendix 2, wherein the model includes a plurality of elements and a joint connected between the plurality of elements, and wherein the motion information volume adjustment part adjusts the information volume of the motion information generated by the motion information generator by adjusting the number of elements included in the model.

(Appendix 4)

The information distribution device according to any one of Appendixes 1 to 3, further comprising a target image information acquisition part configured to acquire information relating to the target image, wherein the distribution part distributes the information relating to the target image acquired by the target image information acquisition part to the terminal device together with the information-volume-adjusted motion information of the target image.

(Appendix 5)

The information distribution device according to Appendix 4, wherein the information relating to the target image is information representing an attribute of the model subjected to distribution.

(Appendix 6)

The information distribution device according to any one of Appendixes 1 to 5, further comprising:

a motion information distribution request acquisition part configured to acquire a motion information distribution request output from the terminal device; and a motion information storage unit configured to store the motion information generated by the motion information generator, wherein the distribution part distributes the motion information stored on the motion information storage unit to the terminal device outputting the motion information distribution request according to the motion information distribution request acquired by the motion information distribution request acquisition part.

(Appendix 7)

The information distribution device according to Appendix 6, wherein the distribution part distributes the motion information stored on the motion information storage unit to the terminal device when the information-volume-adjusted motion information is already distributed to the terminal device outputting the motion information distribution request.

(Appendix 8)

A terminal device comprising:

a terminal information transmitter configured to transmit terminal information either performance information representing a performance of the terminal device or communication quality information representing a communication quality with an information distribution device to the information distribution device;

a motion information receiver configured to receive motion information representing a motion of a model, corresponding to information which is generated by the information distribution device based on the terminal information and obtained via image processing of a target image included in video data, from the information distribution device;

a status acquisition part configured to acquire a status of the terminal device;

a moving image generator configured to generate a moving image of the model according to the status based on the motion information received by the motion information receiver and the status acquired by the status acquisition part; and a display configured to display an image including the moving image generated by the moving image generator.

(Appendix 9)

The terminal device according to Appendix 8, wherein the status acquisition part acquires the status representing a position of the terminal device, and wherein the moving image generator generates the moving image depending on the position acquired by the status acquisition part.

(Appendix 10)

The terminal device according to Appendix 8 or 9, wherein the status acquisition part acquires the status representing a viewpoint position which is designated, and wherein the moving image generator generates the moving image according to the viewpoint position acquired by the status acquisition part.

(Appendix 11)

The terminal device according to any one of Appendixes 8 to 10, wherein the status acquisition part acquires the status representing an ambient brightness of the terminal device, and wherein the moving image generator generates the moving image according to the brightness acquired by the status acquisition part.

REFERENCE SIGNS LIST 100, 100a, 100b video distribution system
2, 2a, 2b terminal device
3, 3a, 3b video data distribution device
20, 20a, 20b, 30, 30a, 30b controller
21 display
22 operation part
23, 31 storage unit
32, 32a information distribution part
201 video list generator
202, 202a presentation part
203 identification information generator
204 identification information output part
205 video acquisition part
206 presentation-start-point information generator
207 setting information output part
208, 208b setting information generator
209 viewpoint information generator
301 identification information acquisition part
302 video output part
303 setting information acquisition part
304 video generator
1001 information distribution system
1010 information distribution device
1100 controller
1101 video data acquisition part
1102 motion information generator
1103 terminal information acquisition part
1104 motion information volume adjustment part
1105 distribution part
1106 adjustment degree information acquisition part
1107 motion information distribution request acquisition part
1108 target image information acquisition part
1150 storage unit
1151 motion information storage medium
1152 target image information storage medium
1020 terminal device
1200 controller
1201 operation detector
1202 terminal information transmitter
1203 communication quality information generator
1204 motion information receiver
1205 motion information generator
1206 display controller
1207 status acquisition part
1250 storage unit
1251 model information storage medium

The invention claimed is:

1. A terminal device comprising a processor configured to execute instructions stored in a memory in communication with a video data distribution device, wherein the processor is configured to:

output identification information representing first video data, which is generated from an original video and obtained by the terminal device, to the video data distribution device;

output setting information including presentation-start-point information representing a presentation-start point to start presenting second video data, which is generated from the original video after the presentation-start point, to the video data distribution device which is configured to store an identification information list representing the identification information in association with the first video data, the second video data, and the original video; and acquire the second video data from the video data distribution device, wherein the second video is generated from the original video captured by a plurality of cameras disposed at different positions according to the identification information.

2. The terminal device according to claim 1, wherein the processor is further configured to:
generate viewpoint information representing a viewpoint to capture the original video, wherein the viewpoint information indicates an imaging position and an imaging direction designated by the first video data such that the second video data is distributed from the video data distribution device according to the viewpoint information; and
generate the setting information representing a setting of the second video data based on the viewpoint information.

3. The terminal device according to claim 1, wherein the second video data is a three-dimensional video which is generated from the original video serving as a multiple-point video.

4. The terminal device according to claim 2, wherein the viewpoint information includes a viewpoint position to capture the original video.

5. The terminal device according to claim 2, wherein the viewpoint information includes a viewpoint angle to capture the original video.

6. The terminal device according to claim 1, wherein the first video data has a smaller amount of data than the second video data.

7. The terminal device according to claim 2, wherein the viewpoint information specifies a single camera among the plurality of cameras configured to capture the original video.

8. The terminal device according to claim 1, wherein the second video data represents a specific model selected from among a plurality of models determined in advance.

9. A video data distribution device comprising a processor configured to execute instructions stored in a memory in communication with a terminal device, wherein the processor is configured to:
acquire identification information representing first video data, which is generated from an original video, from the terminal device;
acquire setting information including presentation-start-point information representing a presentation-start point to start presenting second video data, which is generated from the original video after the presentation-start point, from the terminal device; and
output to the terminal device the second video data, which is generated from the original video captured by a plurality of cameras disposed at different positions with reference to an identification information list representing the identification information in association with the first video data, the second video data, and the original video.

10. The video data distribution device according to claim 9, wherein the setting information represents a setting of the second video data according to viewpoint information indicating an imaging position and an imaging direction designated by the terminal device, thus distributing the second video data to the terminal device according to the viewpoint information.

11. The video data distribution device according to claim 9, wherein the second video data is a three-dimensional video which is generated from the original video serving as a multiple-viewpoint video.

12. The video data distribution device according to claim 10, wherein the viewpoint information includes a viewpoint position to capture the original video.

13. The video data distribution device according to claim 10, wherein the viewpoint information includes a viewpoint angle to capture the original video.

14. The video data distribution device according to claim 9, wherein the first video data has a smaller amount of data than the second video data.

15. The video data distribution device according to claim 10, wherein the viewpoint information specifies a single camera among the plurality of cameras configured to capture the original video.

16. The video data distribution device according to claim 9, wherein the second video data represents a specific model selected from among a plurality of models determined in advance.

17. An information distribution device comprising a processor configured to execute instructions stored in a memory in communication with a terminal device, wherein the processor is configured to:
acquire video data;
generate motion information representing a motion of a model representing a target image extracted from the video data, wherein the motion information is stored on a storage unit in association with target image information representing the target image;
acquire terminal information of the terminal device representing a constraint regarding granularity of images displayable with the terminal device based on either performance information or communication quality information;
adjust an information volume of the motion information to satisfy the constraint according to the terminal information so as to generate information-volume-adjusted motion information; and
distribute the information-volume-adjusted motion information to the terminal device.

18. The information distribution device according to claim 17, wherein the processor is further configured to acquire adjustment degree information representing a degree of adjusting the information volume requested by the terminal device according to the terminal information, and
further adjust the information volume of the motion information based on the adjustment degree information.

19. The information distribution device according to claim 18, wherein the model is selected from among a point model having a single element, a single-joint model having a plurality of elements, and a multiple-joint model having a plurality of elements and a plurality of joints, and
wherein the processor is configured to adjust the information volume of the motion information by representing the multiple-joint model upon adjusting the number of elements included in the multiple joint model.

20. The information distribution device according to claim 9, wherein the processor is further configured to acquire target image information representing a target image extracted from the video data, wherein the distribution part distributes the target image information to the terminal device together with the information-volume-adjusted motion information of the target image.

21. The terminal device according to claim 1, wherein the setting information further includes a predetermined part of the second video data in the original video, communication quality information, and terminal information.

22. The video data distribution device according to claim 9, wherein the setting information further includes a predetermined part of the second video data in the original video, communication quality information, and terminal information.

23. The terminal device according to claim 1, which is configured to request the video data distribution device to distribute the second video data corresponding to the setting information upon a user's authorization.

24. The video data distribution device according to claim 9, which is configured to distribute to the terminal device the second video data corresponding to the setting information upon a user's authorization.

* * * * *